(12) United States Patent
Scholte et al.

(10) Patent No.: US 11,993,712 B2
(45) Date of Patent: May 28, 2024

(54) CURABLE COMPOSITIONS FOR USE AS ADHESIVES HAVING PROPERTIES CAPABLE OF BEING ALTERED BASED ON EXTERNAL STIMULI AND METHODS OF MAKING AND USING THE SAME

(71) Applicant: Arkema France, Colombes (FR)

(72) Inventors: Jon Scholte, Exton, PA (US); Mahendra Christopher Orilall, Downingtown, PA (US); Jeffrey A. Klang, West Chester, PA (US)

(73) Assignee: Arkema France, Colombes (FR)

( * ) Notice: Subject to any disclaimer, the term of this patent is extended or adjusted under 35 U.S.C. 154(b) by 800 days.

(21) Appl. No.: 17/043,414

(22) PCT Filed: Feb. 26, 2019

(86) PCT No.: PCT/EP2019/054751
§ 371 (c)(1),
(2) Date: Sep. 29, 2020

(87) PCT Pub. No.: WO2019/185260
PCT Pub. Date: Oct. 3, 2019

(65) Prior Publication Data
US 2021/0017381 A1  Jan. 21, 2021

Related U.S. Application Data

(60) Provisional application No. 62/650,584, filed on Mar. 30, 2018.

(51) Int. Cl.
*C09J 175/16* (2006.01)
*C08G 18/10* (2006.01)
(Continued)

(52) U.S. Cl.
CPC ............. *C08L 75/16* (2013.01); *C08G 18/10* (2013.01); *C08G 18/4238* (2013.01);
(Continued)

(58) Field of Classification Search
CPC ........ C09J 175/16; C08L 75/16; C08G 18/10; C08G 18/4238; C08G 18/672; C08G 18/755; C08G 18/8166
See application file for complete search history.

(56) References Cited

U.S. PATENT DOCUMENTS

| 6,887,917 B2 | 5/2005 | Yang et al. |
| 9,453,142 B2 | 9/2016 | Rolland et al. |

(Continued)

FOREIGN PATENT DOCUMENTS

| JP | H04227714 A | 8/1992 |
| JP | 2012072328 A2 | 4/2012 |

(Continued)

OTHER PUBLICATIONS

Wojtecki, Rudy, J. et al., "Using the Dynamic Bond to Access Macroscopically Responsive Structurally Dynamic Polymers", Nature Materials, Jan. 2011, pp. 14-27, vol. 10, Macmillan Publishers Limited.

(Continued)

*Primary Examiner* — Michael L Leonard
(74) *Attorney, Agent, or Firm* — Christopher R. Lewis

(57) ABSTRACT

A curable composition provides, upon curing, an adhesive made from energy-curable compounds having one set of adhesive properties (i.e., peel, tack and shear) after curing and a second set of adhesive properties after being subjected to some external stimuli, such as heat, light, chemicals or mechanical stresses. The curable composition comprises at least one urethane (meth)acrylate oligomer having a structure comprising: a1) at least one polyol backbone segment having at least one reacted end; a2) at least one reacted polyisocyanate forming a urethane linkage at the at least one reacted end of each of the at least one polyol backbone segment and a3) at least one blocking end group reacted with the at least one reacted polyisocyanate to form a reversible (Continued)

bond and bearing a (meth)acrylate group and a chain terminator or extender.

40 Claims, 8 Drawing Sheets

(51) Int. Cl.
  *C08G 18/42* (2006.01)
  *C08G 18/67* (2006.01)
  *C08G 18/75* (2006.01)
  *C08G 18/81* (2006.01)
  *C08L 75/16* (2006.01)

(52) U.S. Cl.
  CPC ......... *C08G 18/672* (2013.01); *C08G 18/755* (2013.01); *C08G 18/8166* (2013.01); *C09J 175/16* (2013.01)

(56) References Cited

U.S. PATENT DOCUMENTS

| | | | |
|---|---|---|---|
| 9,534,151 | B2 | 1/2017 | Fujimoto et al. |
| 2009/0111904 | A1* | 4/2009 | Odaka .................. C08G 18/672 522/96 |
| 2016/0160077 | A1* | 6/2016 | Rolland ................ B29C 64/165 521/134 |
| 2019/0092896 | A1* | 3/2019 | Qian ....................... C08L 75/16 |
| 2019/0224914 | A1* | 7/2019 | Matzner ................ B33Y 10/00 |

FOREIGN PATENT DOCUMENTS

| | | |
|---|---|---|
| JP | 2018504473 A | 2/2018 |
| WO | WO2015200201 A1 | 12/2015 |
| WO | WO16190361 A1 | 12/2016 |
| WO | 2017112751 A1 | 6/2017 |

OTHER PUBLICATIONS

Delebecq, Etienne, et al., "On the Versatility of Urethane/Urea Bonds: Reversibility, Blocked Isocyanate, and Non-isocyanate Polyurethane", Chemical Reviews, 2013, pp. 80-118, vol. 113, ACS Publications.

Velankar, Sachin. et al., "High-Performance UV-Curable Urethane Acrylates via Deblocking Chemistry", Journal of Applied Polymer Science, 1996, vol. 62, pp. 1361-1376.

* cited by examiner

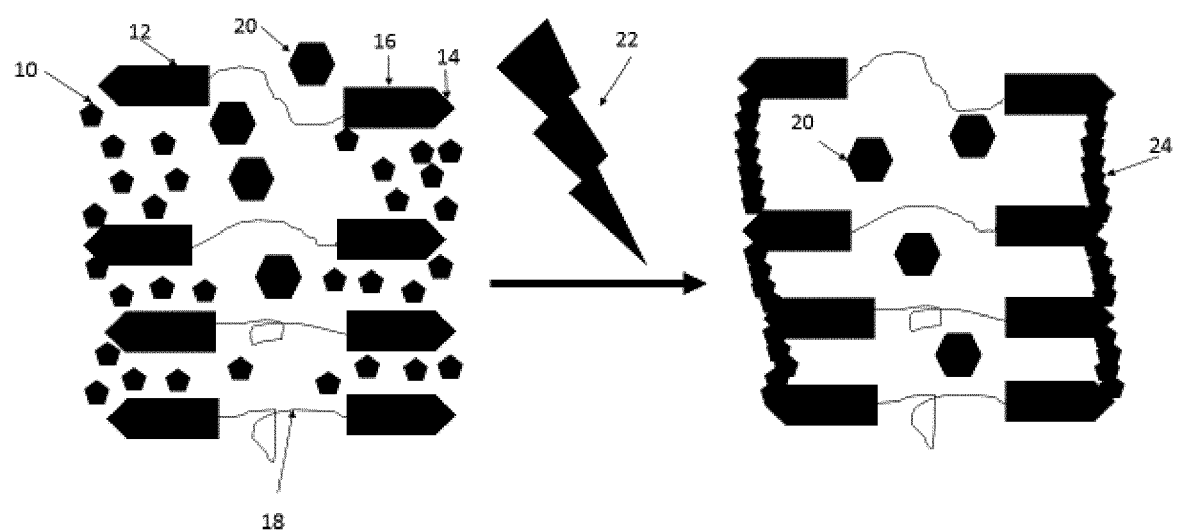

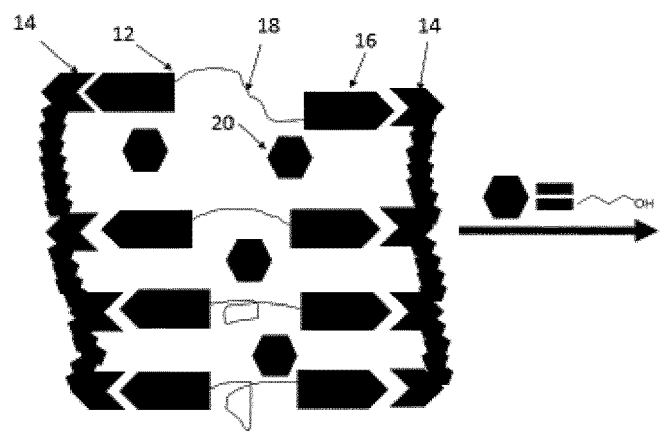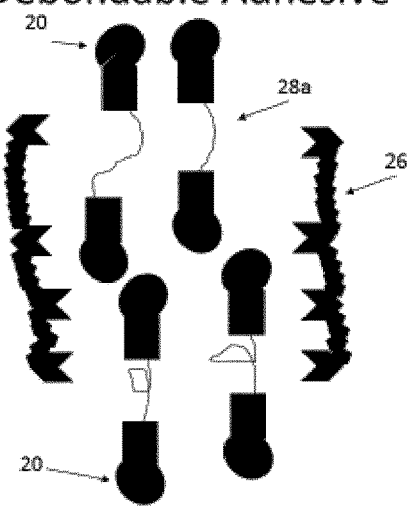
Fig 2a Thermal Deblocking

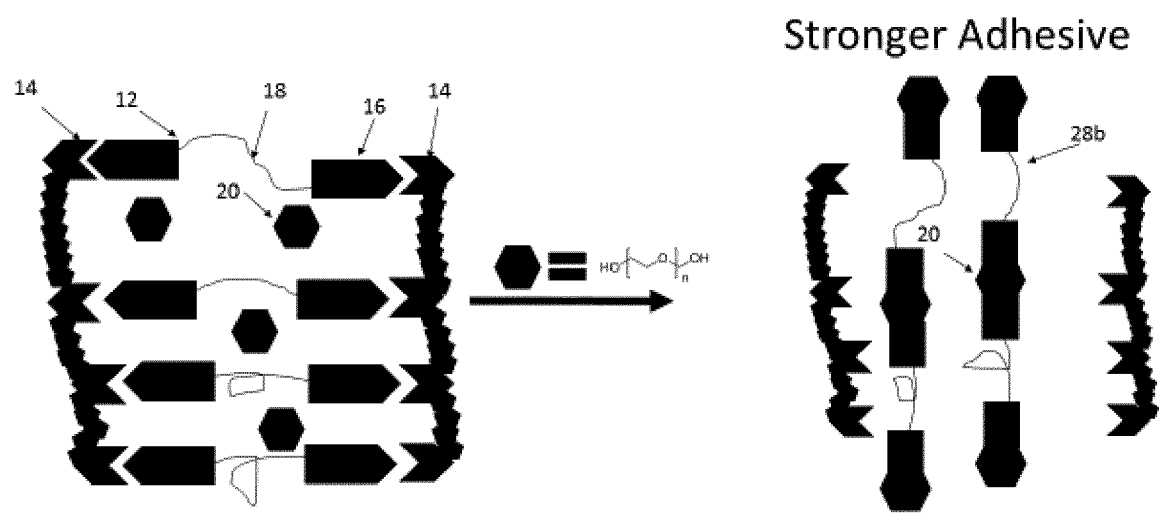

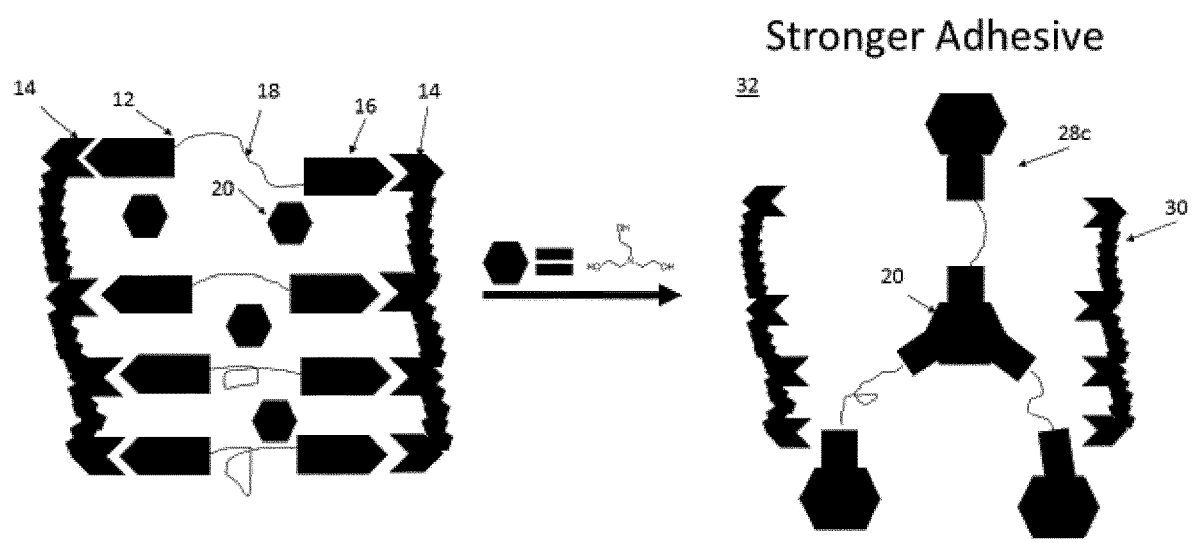

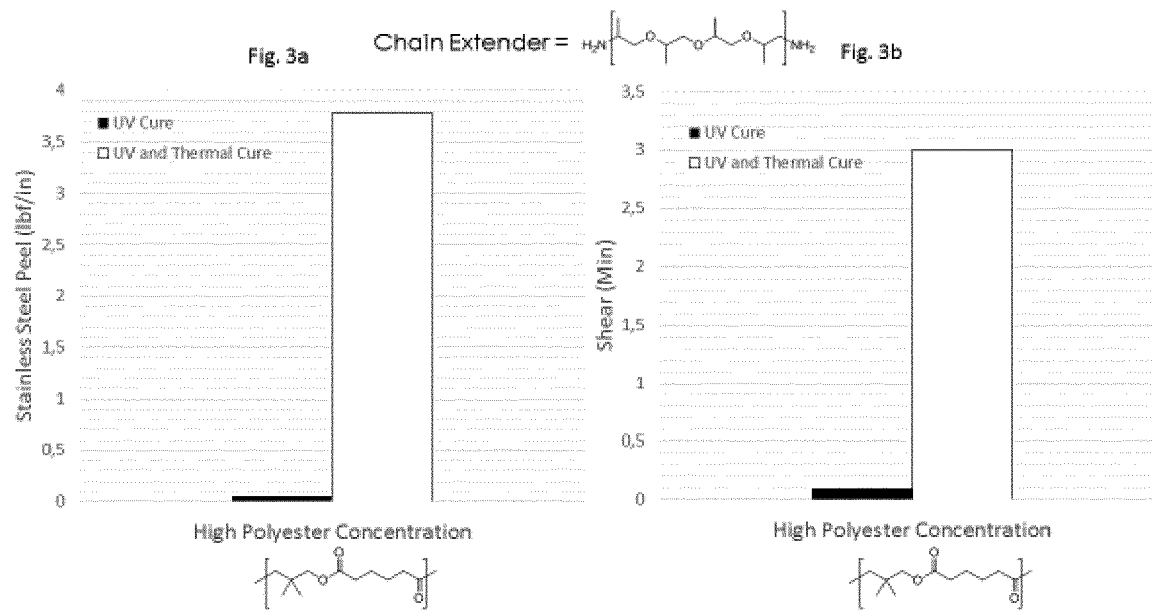

EFFECTS OF THERMOPLASTIC FORMATION

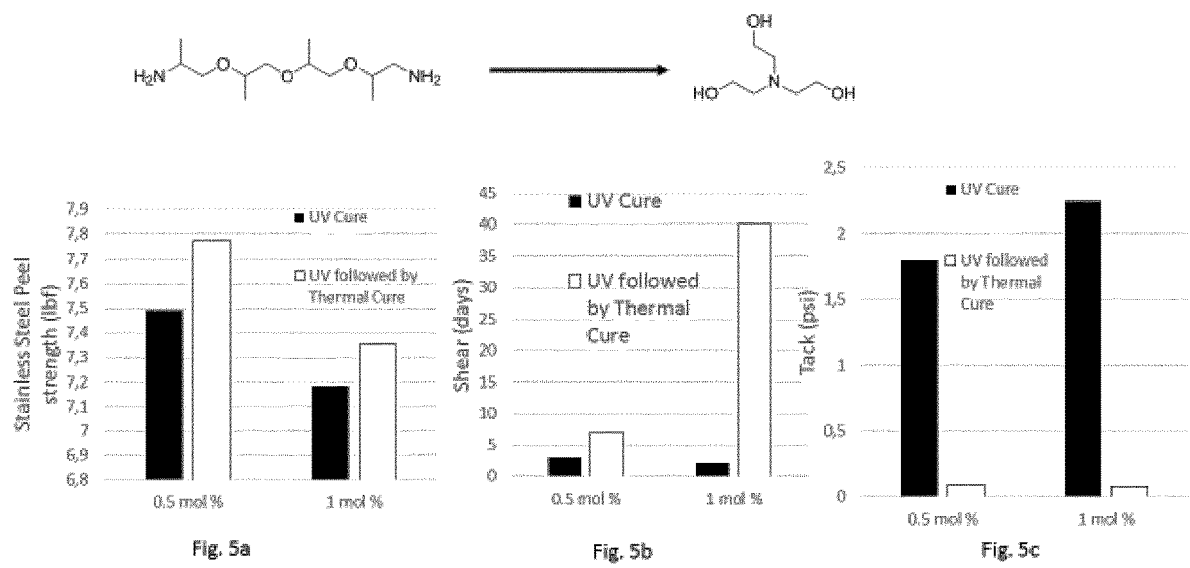

Additional applications-HIGH temperature performance

CURABLE COMPOSITIONS FOR USE AS ADHESIVES HAVING PROPERTIES CAPABLE OF BEING ALTERED BASED ON EXTERNAL STIMULI AND METHODS OF MAKING AND USING THE SAME

CROSS-REFERENCE TO RELATED APPLICATIONS

This application is a U.S. national stage application under 35 U.S.C. § 371 of international application number PCT/EP2019/054751, filed on Feb. 26, 2019, which claims priority to U.S. patent application No. 62/650,584, filed on Mar. 30, 2018.

FIELD OF THE INVENTION

The present invention relates to curable compositions for forming adhesives having properties which can be altered based on external stimuli, such as heat and methods of making and using such compositions, as well as articles and cured compositions made from such curable compositions.

BACKGROUND OF THE INVENTION

Energy curable adhesives are made by transforming a liquid formulation into solid adhesives by exposure to radiation, such as ultraviolet (UV) or electron beam (EB) radiation. The resulting adhesive has fixed adhesive properties and is mainly characterized by its tack, peel and shear strengths. The choice of starting materials (reactive (meth) acrylate monomers and oligomers) provide for precise control over the final tack, peel and shear values. Tack is the property of an adhesive that allows it to adhere to a surface under very slight pressure, peel is the force required to remove a pressure sensitive tape from a test panel or its own backing at a controlled angle and at a standard rate and condition and shear is the ability of a tape to resist the static forces applied along the same plane as the backing. There are countless combinations of desired tack, peel and shear values for various applications (i.e., end uses) of adhesives.

One type of adhesives is pressure sensitive adhesives (PSAs), which form a bond when pressure is applied to bond the adhesive with the adherend. No solvent, water or heat is needed to activate the adhesive. In known PSAs, these adhesive properties are generally fixed after curing. U.S. Pat. No. 6,887,917 describes a pressure-sensitive adhesive composition comprising an acrylate copolymer, a mono-acrylate oligomer, a multi-acrylate oligomer having from 2 to 5 acrylate functional groups per molecule and a photoinitiator.

SUMMARY OF THE INVENTION

It may be advantageous in some applications to provide an adhesive which has one set of adhesive properties (i.e., peel, tack and shear) after curing and then a second set of adhesive properties after being subjected to some external stimuli, such as heat, light, chemicals or mechanical stresses. According to an embodiment of the present invention, a curable composition for making an adhesive comprises: a) at least one urethane (meth)acrylate oligomer having a structure comprising: a1) at least one polyol backbone segment having at least one reacted end, wherein the polyol is selected from the group consisting of polyester, polycaprolactone, polycarbonate, polybutadiene, polydimethylsiloxane and polyfarmasene; a2) at least one reacted polyisocyanate forming a urethane linkage at the at least one reacted end of each of said at least one polyol backbone segment and a3) at least one blocking end group reacted with said at least one reacted polyisocyanate to form a reversible bond and wherein said at least one blocking end group bears a (meth)acrylate group; b) either: b1) a monofunctional chain terminator or b2) a polyfunctional chain extender and c) optionally, at least one monofunctional ethylenically unsaturated monomer or oligomer different from a). It has been found that the application of some external stimuli, such as heat, to the cured composition, causes the reversible bond to deblock, leaving free isocyanates which then react with polyol backbone segments or the reactants of the chain extender, thereby changing the properties of the cured adhesive.

According to another embodiment of the present invention, a method for bonding two substrates with an adhesive comprises the steps of: applying curable composition to a first substrate; curing the curable composition to form an adhesive having a first set of adhesive properties; contacting a second substrate with the adhesive to bond the second substrate with the first substrate and externally stimulating the cured composition to impart a second set of adhesive properties to the adhesive, different from the first set of adhesive properties wherein the curable composition comprises:
a) at least one urethane (meth)acrylate oligomer having a structure comprising:
   a1) at least one polyol backbone segment having at least one reacted end;
   a2) at least one reacted polyisocyanate forming a urethane linkage at the at least one reacted end of each of said at least one polyol backbone segment and
   a3) at least one blocking end group reacted with said at least one reacted polyisocyanate to form a reversible bond and wherein said at least one blocking end group bears a (meth)acrylate group;
b) either:
   b1) a monofunctional chain terminator or
   b2) a polyfunctional chain extender and
c) optionally, at least one monofunctional ethylenically unsaturated monomer or oligomer different from a).

BRIEF DESCRIPTION OF THE DRAWING

FIG. 1 is a schematic of the reaction occurring when a curable composition of the present invention is subjected to radiation.

FIG. 2a is a schematic of a thermal deblocking reaction occurring when heat is applied to a cured composition of the present invention in the presence of a chain terminator.

FIG. 2b is a schematic of a thermal deblocking reaction occurring when heat is applied to a cured composition of the present invention in the presence of a difunctional chain extender.

FIG. 2c is a schematic of a thermal deblocking reaction occurring when heat is applied to a cured composition of the present invention in the presence of a trifunctional chain extender.

FIGS. 3a and 3b show the peel strength and shear strength of an adhesive made from a curable composition of the present invention.

FIGS. 5a-5c show the peel strength, shear strength and tack, respectively, of adhesives made from two different blends of the present invention which include a small amount of the polyether diamine chain extender replaced with triethanol amine at 0.5 and 1 mol % to produce inter-penetrating networks after the thermal cure step.

DETAILED DESCRIPTION OF THE INVENTION

Figure 4A:
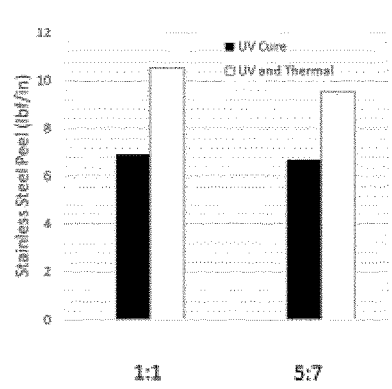
FIGS. 4a-4c show the peel strength, shear strength and tack, respectively, of adhesives made from two different blends of the present invention.
Figure 4B:
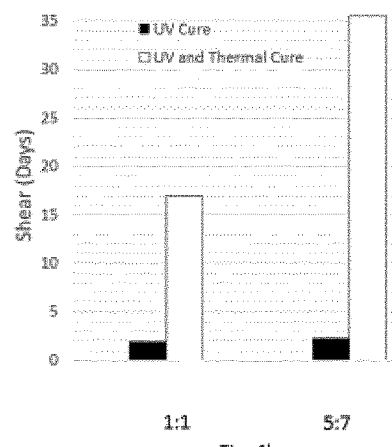
Figure 4C:
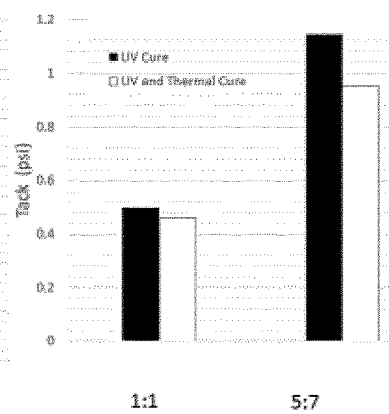

According to an embodiment of the present invention, the curable compositions for making an adhesive comprise: a) at least one urethane (meth)acrylate oligomer having a structure comprising: a1) at least one polyol backbone segment having at least one reacted end, wherein the polyol comprises polyester; a2) at least one reacted polyisocyanate forming a urethane linkage at the at least one reacted end of each of said at least one polyol backbone segment and a3) at least one blocking end group reacted with said at least one reacted polyisocyanate to form a reversible bond and wherein said at least one blocking end group bears a (meth)acrylate group; b) either: b1) a monofunctional chain terminator or b2) a polyfunctional chain extender and c) optionally, at least one monofunctional ethylenically unsaturated monomer or oligomer different from a), wherein the at least one urethane (meth)acrylate oligomer has a molecular weight distribution having two primary peaks comprising a lower molecular weight peak in a range of 800 to 1,500 g/mol and a higher molecular weight peak in a range of 6,000 to 12,000 g/mol. These peak molecular weights are determined by GPC with polystyrene standards and THF as mobile phase. Preferably, the ratio of the lower molecular weight peak to the higher molecular weight peak is from about 1:8 to 3:1, preferably 1:4 to 2:1, most preferably 3:10 to 1:1. In another embodiment in which b) is the chain extender, the urethane (meth)acrylate oligomers has a molecular weight distribution wherein the $MW_{10}$ is in the range of 800 to 1,500 g/mol, the $MW_{90}$ is in the range of 6,000 to 12,000 g/mol. In still another embodiment in which b) is the chain extender, the number average molecular weight of the at least one urethane (meth)acrylate oligomer is in the range of 3,000 to 5,000 g/mol. In yet another embodiment in which b) is the chain extender, the number average molecular weight of the at least one urethane (meth)acrylate oligomer is at least 3,000 g/mol, preferably at least 4,000 g/mol and most preferably at least 5,000 g/mol or preferably, the number average molecular weight of the at least one urethane (meth)acrylate oligomer is in the range of 2,000 to 25,000 g/mol, more preferably 2,500 to 12,000 g/mol, even more preferably 2,500 to 8,000 g/mol, still more preferably 2,750 to 7,000 g/mol and most preferably 3,000 to 6,000 g/mol. As used herein, whenever molecular weight is referred to herein, the number average molecular weight is determined by gel permeation chromatography, using polystyrene standards and THF as the mobile phase, for comparison and is measured within five minutes after completion of the synthesis of the oligomer.

It has been found that the application of some external stimuli, such as heat, to the cured composition, causes the reversible bond to deblock, leaving free isocyanates which then react with polyol backbone segments or the reactants of the chain extender, thereby changing the properties of the cured adhesive. If a chain terminator (which is monofunctional and thus comprises one reactant) is used, it has been found that the adhesive becomes more thermoplastic and is easily delaminated or removed from its substrate after exposure to such external stimuli. If a chain extender (which is polyfunctional and comprises multiple reactants) is used, it has been found that the shear and/or peel strength of the adhesive increases after exposure to such external stimuli. Consequently, the present invention permits the preparation of cured compositions having adhesive properties which can be altered by exposing such cured compositions to external stimuli, such as heat. Throughout this application, whenever a functionality of a constituent or material is mentioned, it is intended to refer to the functionality of that constituent or material before any reaction involving the relevant functional or reactive group and valence of that constituent or material afterwards. As one of ordinary skill in the art would recognize, that functionality becomes a valence when the constituent or material is in its reacted state but, for simplicity herein, may be referred generally as a functionality.

The at Least One Urethane (Meth)Acrylate Oligomer

As previously explained, a constituent of the curable compositions of the present invention is a mixture of urethane (meth)acrylate oligomers. Each of the oligomers has a structure comprising: a1) at least one polyol backbone segment having at least one reacted end, wherein the polyol comprises polyester; a2) at least one reacted polyisocyanate forming a urethane linkage at the at least one reacted end of each of said at least one polyol backbone segment and a3) at least one blocking end group reacted with said at least one reacted polyisocyanate to form a reversible bond and wherein said at least one blocking end group bears a (meth)acrylate group wherein the at least one urethane (meth)acrylate oligomer has a molecular weight distribution having two primary peaks comprising a lower molecular weight peak in a range of 800 to 1,500 g/mol and a higher molecular weight peak in a range of 6,000 to 12,000 g/mol.

The number of ends of each oligomer could be two, in the event that only linear polyols are used and diisocyanates or used or it could be more than two if multifunctional polyols and/or polyisocyanates are used. In an embodiment of the invention, the at least one urethane (meth)acrylate oligomer comprises a plurality of the oligomers and all of the oligomers have a blocking end group at each of the ends of the oligomers. In such embodiments, there is either a stoichiometric equivalent amount of blocking end groups relative to polyol backbone segments and isocyanate groups of the polyisocyanates or there is a stoichiometric excess of such blocking end groups relative to polyol backbone segments and isocyanate groups of the polyisocyanates. In other embodiments, the at least one urethane (meth)acrylate oligomer comprises a plurality of the oligomers and the plurality comprises: (i) a first set of the oligomers having one blocking end group at least one of the ends of the oligomer and having one of the at least one polyol backbone segments with an unreacted end at least one of the ends of the oligomer and (ii) a second set of the oligomers having a blocking end group at each of the ends of the oligomer. The first set of the oligomers has a stoichiometric excess of the polyol backbone segments relative to the blocking end group. In some embodiments, the mixture of oligomers is a distribution of various oligomers in which the ratio of the number of reacted blocking end groups divided by the number of oligomers in the mixture (defined herein as "X") varies. In such embodiments, X may lie between 1 and about 3, preferably between about 1.25 and about 2.25 and most preferably between about 1.8 and 1.99. It should be pointed out that these X values refers only to oligomers as described above, even though such oligomers might be combined with other oligomers that do not contain any reacted blocking end groups in a curable composition. The value of X may exceed two when a trifunctional polyol (e.g., triethanol amine) or a polyol of even greater functionality is used and/or a polyisocyanate is used. When only difunctional polyols and diisocyanates are used, the value of X is between 1 and 2 (or equal to 2 in the presence of a stoichiometric equivalent or excess of blocking end groups or used) and preferably about 1.8 and about 1.99.

An oligomer of the present invention is represented by Formula (I) and shows: a single polyol backbone segment having one reacted end and one unreacted end, wherein the polyol is a polyester; a2) a reacted polyisocyanate (namely a diisocyanate) forming a urethane linkage at the reacted end of the one polyol backbone segment and a3) a blocking end group reacted with the reacted polyisocyanate to form a reversible bond and wherein the blocking end group bears a (meth)acrylate group. Thus, the oligomer of Formula I is an example of the first set of oligomers mentioned above having one blocking end group at one of the end of the oligomer and having one of the polyol backbone segments with an unreacted end at one end of the oligomer.

(Formula I)

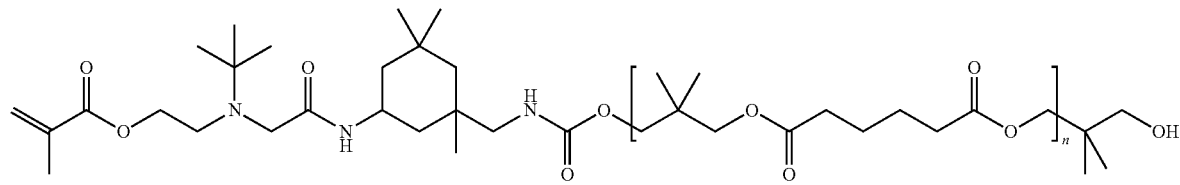

Formula I shows an oligomer having only one polyol backbone segment (having n repeat units) with just one reacted end and only one reacted diisocyanate forming, at its first end, the urethane linkage at the reacted end of the polyol backbone segment. The oligomer shown in Formula I also only has one blocking end group reacted with the reacted diisocyanate to form a reversible bond at the second end of the reacted diisocyanate. In Formula I, the blocking end group comprises a (meth)acrylate group and is tert-butyl aminoethyl methacrylate (t-BAEMA). Thus, the reversible bond is a urea linkage in this embodiment.

The polyester segment shown in Formula I is a possible option for the polyol segment. As stand-alone segments, each polyol segment is terminated by a hydroxyl group; however, upon reaction with an adjacent isocyanate group, the hydrogen of such hydroxyl group is liberated to form the urethane linkage as shown in Formula I. Accordingly, in this embodiment, the only diisocyanate has a urethane linkage at one end where it is reacted with a polyol segment and a urea linkage at its other end where it is reacted with the blocking end group. In other embodiments, there are additional diisocyanates and polyol segments and possibly a second blocking end group, as shown in Formula II:

(Formula II)

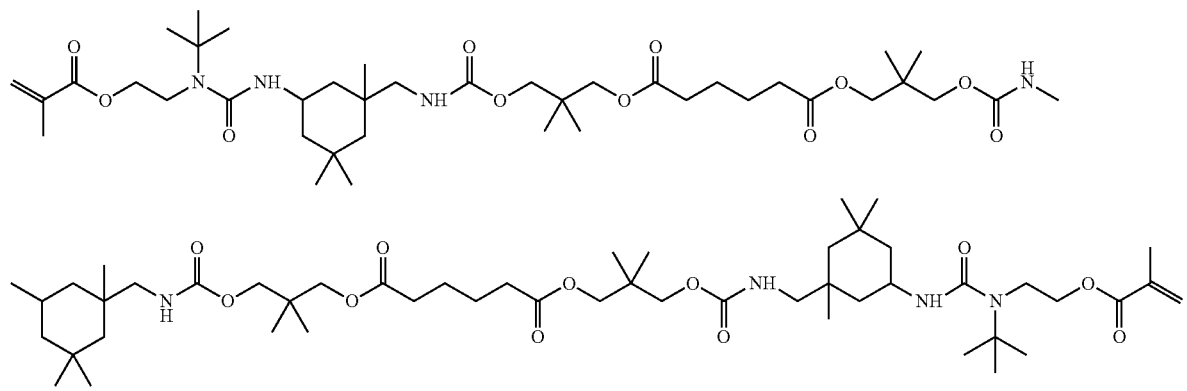

In Formula II, three polyisocyanates (namely, diisocyanates) are shown in the oligomer, but a wide range of polyisocyanates may be included in each oligomer. In Formula II, the two terminal diisocyanates are reacted, at one end, to a blocking end group to form the reversible bond (i.e., the urea bond as shown) and are reacted at their other end with a hydroxyl of an adjacent polyol segment to form a urethane bond. These terminal diisocyanates are the furthest left and right diisocyanates shown in the oligomer of Formula II. The diisocyanate shown in the middle of the oligomer of Formula II is reacted at both of its ends with respective hydroxyl groups of adjacent polyol segments. In other embodiments, the oligomer has additional diisocyanates and additional corresponding polyol segments. As can be envisioned, if a higher functional polyisocyanate is used (e.g., a triisocyanate), then any combination may be used, such as a triisocyanate attached at each isocyanate group to a polyol segment, such as in the case of a non-terminal triisocyanate or one or two of the isocyanate groups could be reacted with a blocking end group.

The at least one polyol backbone segment having reacted ends comprises a polyester. Preferably, the at least one polyol backbone segment excludes polyether. In other embodiments, the at least one polyol backbone segment consists essentially of, or consists of, polyester. The at least one polyol backbone segment may be branched or linear and can be substituted or not. As discussed in more detail below, the curable composition also comprises either b1) a monofunctional chain terminator or b2) a polyfunctional chain extender. The molecular weight distribution having two primary peaks can be attained by using a particular polyester having a suitable molecular weight distribution. It can also be attained by using a blend of a high molecular weight polyester and a low molecular weight polyester.

Each oligomer may contain any suitable number of polyol backbone segments as appropriate for the desired properties of the composition and cured composition. Preferably, each oligomer in a mixture may contain on average between 1 and 8, preferably between 1 and 6 and most preferably between 2 and 4 polyol backbone segments. Of course, the number of polyol backbone segments may vary from oligomer to oligomer in a mixture and depends on a number of factors, including the desired molecular weight of the oligomer and the molecular weight of each segment. Moreover, the molecular weight of each polyol backbone segment may vary over a suitable range, again depending on the desired properties of the composition. In embodiments of the invention, the number average molecular weight of each polyol segment may vary between about 200 and about 8000 g/mol, preferably between about 500 to about 4000 g/mol, most preferably between about 500 to about 2000 g/mol. By having at least one reacted end, each polyol segment has at least one end whose hydroxyl group has reacted with an isocyanate to form the urethane linkage shown in Formulas I and II. Such a reaction is shown here, in Scheme I:

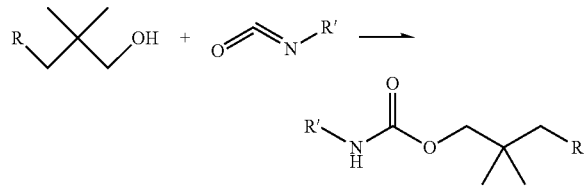

(Scheme I)

In some embodiments, it has been found advantageous to use polyester as the polyol backbone, specifically. Furthermore, it has been found especially advantages, when seeking a curable composition which, when cured, has improved peel and shear properties, to provide a blend of at least two different polyol backbone segments in which the ratio of high molecular weight polyester to low molecular weight polyester ranges from about 1:8 to 3:1, preferably 1:4 to 2:1, most preferably 3:10 to 1:1. As used in this context, the high molecular weight polyester has a number average molecular weight of between about 6,000 and about 12,000 g/mol (preferably between about 7,000 and about 11,000 g/mol) and the low molecular weight polyester has a number average molecular weight of between about 800 and about 1,500 g/mol (preferably between about 1,000 and about 1,400 g/mol). In most cases discussed herein, the polyol backbone segment has a functionality (before reaction, valence afterwards) of two, but it can vary depending on the desired properties of the curable composition and cured product. The polyol backbone segment may have a functionality of at least two, preferably between 2 to 4 and most preferably is difunctional.

As shown in Formulas I and II above, the oligomer includes at least one reacted polyisocyanate (shown in Formulas I and II as a diisocyanate) forming a urethane linkage at the at least one reacted end of each of the at least one polyol backbone segment. As described above, these may be terminal diisocyanates, which are reacted at one end to a blocking end group to form the reversible bond and at their other end with a hydroxyl of an adjacent polyol segment. If only one diisocyanate is present in the oligomer, it will be a terminal diisocyanate. In embodiments in which greater than two diisocyanates are present, then all of the non-terminal diisocyanates will be reacted with adjacent polyol segments, as shown in Formula II. In some embodiments, the polyisocyanate is a diisocyanate and the diisocyanate may be any number of suitable diisocyanates and may be selected from the group consisting of isophorone diisocyanate, toluene diisocyanate, hexamethylene diisocyanate, trimethylhexamethylene diisocyanate and dicyclohexylmethane-4,4'-diisocyanate. In other embodiments, the polyisocyanate may be in the form of a polymeric diisocyanates, such as biurets or isocyanurates. Preferably, the diisocyanate is isophorone diisocyanate.

As shown in Formulas I and II above, the oligomer includes at least one blocking end group reacted with the at least one reacted diisocyanate to form a reversible bond and wherein the at least one blocking end group bears a (meth)acrylate group. The blocking end group can be selected from a wide range of possibilities so long as it is able to react with an isocyanate group and form a reversible bond. The bond may be reversible by any number of external stimuli, such as heat, light, chemical reaction or mechanical stress. Any bond which becomes labile under any of such external stimuli is suitable for the present invention. In the examples shown in Formulas I and II, the tert-butyl amino group forms a urea bond with the adjacent diisocyanate, which is labile at elevated temperatures, such as at 100° C. The at least one blocking end group comprises a functional group adapted to form the reversible bond with the diisocyanate. The functional group adapted to form the reversible bond with the diisocyanate may be selected from the group consisting of alcohols, phenols, pyridinols, oximes, thiophenols, mercaptans, amides, cyclic amides, imides, imidazoles, imidazolines, pyrazoles, triazoles, amidines, hydroxamic acid esters, uretdiones and sterically hindered amines. Preferably, the functional group comprises a sterically hindered amine and the reversible bond is a urea bond and the external stimuli to reverse the reaction and thereby decouple the urea bond is heat. Still more preferably and as shown in Formulas I and II, the at least one blocking end group is tert-butyl aminoethyl methacrylate (t-BAEMA) and the reversible bond is a urea bond.

The Chain Terminator or the Chain Extender

As mentioned above, the curable composition for making an adhesive according to the present invention further comprises either b1) a monofunctional chain terminator (i.e., comprising only one reactant) or b2) a polyfunctional chain extender (i.e., comprising two or more reactants). In one embodiment, component b) comprises, consists essentially of, or consists of one or more chain terminators. The monofunctional chain terminator acts to cap the freed isocyanates and turn the photocured thermoset material into a thermoplastic with very short polyurethane molecules and much larger acrylic chains. The length and structure of the monofunctional chain terminator can be selected to modify the resulting thermoplastic material. The chain terminator is selected such its reactant comprises a reactive group that is more thermodynamically stable with isocyanate groups than the blocking end group is with isocyanate groups under the conditions of the external stimuli. For example, in an embodiment in which the blocking end group is t-BAEMA, the external stimuli may be applying heat (e.g., to about 100° C.). The reactant selected should be one which is more thermodynamically stable with isocyanate groups than the t-BAEMA is with isocyanate groups under heat at about 100° C. In embodiments in which the chain terminator is used, the reactive group of the chain terminator is preferably selected from the group consisting of alcohols, amines and thiols and most preferably is a primary alcohol or a primary amine. It should be noted that, if an amine is used, this is different from the amine of the blocking end group (if the blocking end group uses an amine), such that the amine of the chain terminator is more thermodynamically stable than the amine of the blocking end group, such as by being less sterically hindered than the amine of the blocking end group. In some embodiments, the monofunctional chain terminators may be selected from dodecanol, dodecane thiol, n-butanol, phenol, lauryl amine and stearyl amine.

In another embodiment, component b) comprises, consists essentially of, or consists of one or more polyfunctional chain extenders (i.e., comprising at least two reactants), meaning that the chain extenders have two or more functional groups. These materials act to extend the polyurethane polymer and significantly increase the molecular weight of these materials. These multifunctional chain extenders can be selected by molecular weight or chemical composition to increase or decrease the $T_g$ of the final UV cured material. Multifunctional chain extenders can include but are not limited polypropylene glycols, neopentyl adipate esters, silicones and polycarbonates. The reactive group of the chain extenders could include alcohols, amines and thiols. The chain extender may be difunctional or trifunctional. In further embodiments, the chain extender is difunctional and comprises polypropylene glycol or polypropylene diamine. In other embodiments, the chain extender is trifunctional and comprises triethanol amine. It has been found that attaching the amine to a polypropylene group is important in some applications as the polypropylene group tends to act like an intermediate between a primary and secondary amine. In some embodiments, the use of such amines results in the formation of polyurea upon deblocking of the isocyanate, leading to additional hydrogen bonding and often increased strength. As in the case with the chain terminator, the reactive groups of the chain extender are selected such that they are more thermodynamically stable with isocyanate groups than the blocking end group is with isocyanate groups under the conditions of the external stimuli. For example, in an embodiment in which the blocking end group is t-BAEMA, the external stimuli may be applying heat (e.g., to about 100° C.). The reactant selected should be one which is more thermodynamically stable with isocyanate groups than the t-BAEMA is with isocyanate groups under heat at about 100° C.

In some embodiments of the invention in which component b) comprises or is the chain extender, the chain extender is trifunctional and comprises triethanol amine. In other such embodiments, the chain extender comprises a difunctional and a trifunctional reactant. In such embodiments, the difunctional reactant is preferably present in an amount of between about 1 to 200 mol % of the deblocked isocyanate concentration, preferably between about 50 and about 150 mol % of the deblocked isocyanate concentration and most preferably between about 95 and about 105 mol % of the deblocked isocyanate concentration and the trifunctional reactant is preferably present in an amount of between about 0.01 and about 100 mol % of the deblocked isocyanate concentration, preferably between about 0.05 and about 10 mol % of the deblocked isocyanate concentration and most preferably between about 0.5 and about 5 mol % of the deblocked isocyanate concentration. In other embodiments in which component b) comprises or is the chain extender, the polyfunctional reactants comprise a difunctional reactant and a trifunctional reactant, the weight ratio of the trifunctional reactant to the difunctional reactant is preferably between about 1:1,000 and about 1:40, preferably between about 1:200 and about 1:20, most preferably between about 1:150 and about 1:40.

Monofunctional Ethylenically Unsaturated Monomer or Oligomer

The curable composition for making an adhesive according to the present invention may also comprise a monofunctional ethylenically unsaturated monomer or oligomer that is different from the a) at least one urethane (meth)acrylate oligomer. Such monomers or oligomers contain at least one carbon-carbon double bond, in particular a carbon-carbon double bond capable of participating in a free radical reaction wherein at least one carbon of the carbon-carbon double bond becomes covalently bonded to an atom, in particular a carbon atom, in a second molecule. Such reactions may result in a polymerization or curing whereby the ethylenically unsaturated compound becomes part of a polymerized matrix or polymeric chain. The carbon-carbon double bond may be present as part of an α,β-unsaturated carbonyl moiety, e.g., an α,β-unsaturated ester moiety such as an acrylate functional group or a methacrylate functional group or an α,β-unsaturated amide moiety such as an acrylamide functional group or a methacrylamide functional group. A carbon-carbon double bond may also be present in the additional ethylenically unsaturated compound in the form of a vinyl group —CH=CH$_2$ (such as an allyl group, —CH$_2$—CH=CH$_2$).

Preferably, the monofunctional ethylenically unsaturated monomer or oligomer is at least one monofunctional (meth) acrylate monomer. As used herein, the term "(meth)acrylate" refers to both acrylate (—O—C(=O)—CH=CH$_2$) and methacrylate (—O—C(=O)—C(CH$_3$)=CH$_2$) functional groups. The at least one monofunctional (meth)acrylate monomer may be used to function as a diluent by reducing viscosity of the curable compositions of the invention and allowing for easier processing, such as mixing. It also may serve to adjust the flexibility, strength or modulus, among other properties, of finished articles obtained by curing the compositions. The at least one monofunctional (meth)acrylate monomer may comprise a low Tg monofunctional (meth)acrylate monomer. Any suitable low Tg monofunctional (meth)acrylate monomer may be used and it may be selected from the group consisting of butyl acrylate, octyl acrylate, iso-octyl acrylate, decyl-acrylate, isodecyl acrylate, ethoxylate tetrahydrofuryl acrylate, tert-butyl acrylate and tert-butyl methacrylate. Having a "low Tg" means that the low Tg monofunctional (meth)acrylate monomer has a Tg (as measured by differential scanning calorimetry) of less than about 0° C.

In other embodiments, the at least one monofunctional (meth)acrylate monomer may comprise a high Tg monofunctional (meth)acrylate monomer instead of or in addition to the low Tg monofunctional (meth)acrylate monomer. Any suitable high Tg monofunctional (meth)acrylate monomer may be used, and may comprise a monofunctional (meth) acrylate bearing at least one cycloaliphatic group. The high Tg monofunctional (meth)acrylate may comprise isobornyl (meth)acrylate. Having a "high Tg" means that the high Tg monofunctional (meth)acrylate monomer has a Tg (as measured by differential scanning calorimetry) of greater than about 30° C.

More generally, polymerizable monomers suitable for use in the present invention include the following types of monomers:
  i) cyclic monofunctional (meth)acrylate monomers, such as isobornyl (meth)acrylate, cyclohexyl (meth)acrylate, 4-tert-butyl cyclohexyl (meth)acrylate and alkoxylated analogues thereof and
  ii) linear and branched monofunctional (meth)acrylate monomers, such as isodecyl (meth)acrylate, ethoxyethoxyethyl (meth)acrylate, polyethylene mono (meth) acrylates, neopentyl glycol (meth)acrylates and alkoxylated analogues thereof, as well as caprolactone-based (meth)acrylates prepared by addition of one, two, three or more moles of caprolactone to a hydroxyalkyl (meth)acrylate such as hydroxyethyl (meth)acrylate ("caprolactone adducts of hydroxyalkyl (meth)acrylates").

If an oligomer is selected as the monofunctional ethylenically unsaturated monomer or oligomer, then the oligomer preferably has a viscosity lower than the viscosity of the blocking end group and a molecular weight below 2,000 g/mol, preferably below 1,000 g/mol and most preferably below 500 g/mol.

Turning to the reactions of the various constituents, FIG. 1 shows schematically the reactions occurring upon curing of the curable composition, such as by exposure to ultraviolet radiation. Before curing, the composition comprises monofunctional ethylenically unsaturated monomers 10, urethane (meth)acrylate oligomers 12 comprising reacted blocking end groups 14, reacted diisocyanates 16 and polyol backbone segments 18 having reacted ends. Also present in the composition are chain terminators or extenders 20. Upon exposure to ultraviolet radiation 22, the monofunctional ethylenically unsaturated monomers polymerize with themselves and the (meth)acrylate groups of the blocking end groups, forming a polyemerized structure shown as 24. The remainder of the composition is largely unchanged, with the structure of oligomers 12 remaining generally the same and the chain terminators or extenders 20 remaining unreacted. The blocking end groups 14 which are reacted with isocyanate groups of the diisocyanates 16 form a reversible bond, which is labile under certain conditions.

FIGS. 2a, 2b and 2c show schematically the reactions which occur during heating when a chain terminator, difunctional chain extender and trifunctional chain extender, respectively, are used. In these figures, the following legends are used: As shown FIG. 2a, heat is applied in the reaction, although some other external stimuli could be used if a bond is used which is labile in response to some other stimuli, such as certain chemicals or mechanical stress. Upon such application of heat (shown by the arrow in FIG. 2a), the end groups of the deblockable oligomers undergo a reverse reaction from that of forming the oligomer, thereby leaving the free isocyanate groups to react with the monofunctional chain terminators. The resulting changes to the polymeric material originate from transitioning the material from a thermoset to a thermoplastic-like material. The material is no longer a crosslinked polymer network but now consists of a mixture or long acrylic linear polymers 26 and short polyurethane linear polymers 28a.

As shown FIG. 2b, heat or some other external stimuli is applied in the reaction, as shown by the arrow. Upon such application of heat, the end groups of the deblockable oligomers undergo the reverse reaction relative to the formation of the oligomer, thereby leaving the free isocyanate groups to react with the difunctional chain extenders. The resulting linear polyurethane materials 28b are significantly longer than those formed in FIG. 2a because the difunctional chain extender serves to couple two oligomers that were formerly uncoupled, by reacting with a free isocyanate of a first oligomer at one end and reacting with a free isocyanate of a second oligomer at its second end. This produces a viscoelastic solid with complex rheology. This composition is now capable of both wetting out a surface but has sufficient internal toughness to resist shearing forces. By modifying the ratio of oligomers, the material can be made to flow and wet out a surface better or can have its shear resistive properties increased selectively.

As shown FIG. 2c, heat or some other external stimuli is applied in the reaction, as shown by the arrow. Upon such application of heat, the end groups of the deblockable oligomers undergo the reverse reaction relative to the formation of the oligomer, thereby leaving the free isocyanate groups to react with the trifunctional chain extenders. In the presence of a trifunctional chain extender, such as triethanol amine, an interpenetrating network 32 forms. The network 32 is comprised of a now loosely crosslinked polyurethane material 28c interpenetrated with the linear acrylic materials 30.

Polyfunctional Ethylenically Unsaturated Monomer or Oligomer

The curable composition of the invention may further comprise a polyfunctional ethylenically unsaturated monomer or oligomer, such as a difunctional (meth)acrylate monomer. The at least one polyfunctional ethylenically unsaturated monomer or oligomer may be used to function as a diluent by reducing viscosity of the curable compositions of the invention and allowing for easier processing, such as mixing. It also may serve to adjust the flexibility, strength or modulus, among other properties, of finished articles obtained by curing the compositions. Illustrative examples of suitable polyfunctional ethylenically unsaturated monomers or oligomers include hexanediol diacrylate, PEG diacrylate, 1,3-butylene glycol di(meth)acrylate, butanediol di(meth)acrylate, 1,6-hexanediol di(meth)acrylate, alkoxylated hexanediol di(meth)acrylate, alkoxylated aliphatic di(meth)acrylate, alkoxylated neopentyl glycol di(meth)acrylate, dodecyl di(meth) acrylate cyclohexane, dimethanol di(meth)acrylate, diethylene glycol di(meth)

acrylate, dipropylene glycol di(meth)acrylate, n-alkane di(meth) acrylate, polyether di(meth) acrylates, ethoxylated bisphenol A di(meth)acrylate, ethylene glycol di(meth)acrylate, neopentyl glycol di(meth)acrylate, polyester di(meth) acrylate, polyethylene glycol di(meth)acrylate, polypropylene glycol di(meth)acrylate, propoxylated neopentyl glycol diacrylate, tricyclodecane dimethanol diacrylate, triethylene glycol di(meth)acrylate, tetraethylene glycol di(meth)acrylate tripropylene glycol di(meth)acrylate, dicyclopentadiene di(meth)acrylate, dodecanediol di (meth)acrylate, dodecane di (meth)acrylate and combinations thereof.

Auxiliary Oligomer Having Non-Deblocking End Groups

The curable composition of the invention may further comprise e) an auxiliary oligomer having end groups that are more thermodynamically stable with isocyanate groups than the chain extender is with isocyanate groups under the conditions of the external stimuli. For example, in an embodiment in which the blocking end group is t-BAEMA such as that shown in Formula I, the external stimuli may be applying heat. Under such conditions, the end groups of the auxiliary oligomer should be one which are more thermally stable with the isocyanate groups than the chain extender is with isocyanate groups, so that the auxiliary end groups do not "deblock" under the external stimuli. Such an oligomer might have the following structure as shown in Formula III:

functional components (in particular, diols) and polycarboxylic acid functional compounds (in particular, dicarboxylic acids and anhydrides). The polyhydroxyl functional and polycarboxylic acid functional components can each have linear, branched, cycloaliphatic or aromatic structures and can be used individually or as mixtures.

Examples of suitable epoxy (meth)acrylates include the reaction products of acrylic or methacrylic acid or mixtures thereof with glycidyl ethers or esters.

Suitable polyether (meth)acrylates include, but are not limited to, the condensation reaction products of acrylic or methacrylic acid or mixtures thereof with polyetherols which are polyether polyols. Suitable polyetherols can be linear or branched substances containing ether bonds and terminal hydroxyl groups. Polyetherols can be prepared by ring opening polymerization of cyclic ethers such as tetrahydrofuran or alkylene oxides with a starter molecule. Suitable starter molecules include water, hydroxyl functional materials, polyester polyols and amines.

Preferably, the auxiliary oligomer is a urethane (meth) acrylate different from the urethane (meth)acrylate of a). Polyurethane (meth)acrylates (sometimes also referred to as "urethane (meth)acrylates") capable of being used in the curable compositions of the present invention include urethanes based on aliphatic and/or aromatic polyester polyols Formula III

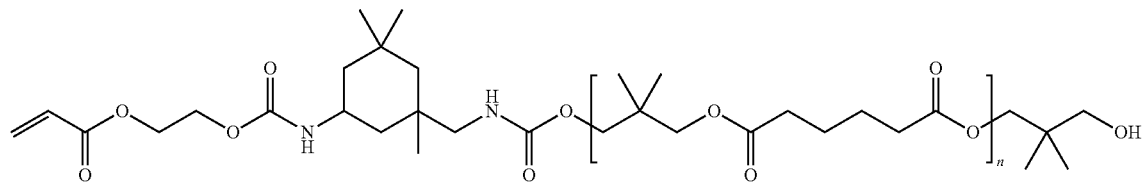

As can be seen by comparing Formula III with Formula I, the t-BAEMA of Formula I is replaced with hydroxylethyl acrylate (HEA), thereby forming a urethane linkage with the adjacent diisocyanate as opposed to the urea linkage of Formula I. The urethane linkage does not undergo is not thermally labile, so it does not under deblocking upon the application of heat, which causes the urea bond to undergo a reverse reaction. Including an auxiliary oligomer in the curable composition of the present invention serves to dilute or dampen the effects caused by including only oligomers having a blocking end group which deblocks. Such oligomers may be selected and used to enhance the flexibility, strength and/or modulus, among other attributes, of a cured composition prepared using the curable composition of the present invention.

Suitable auxiliary oligomers include, for example, polyester (meth)acrylates, epoxy (meth)acrylates, polyether (meth)acrylates, polyurethane (meth)acrylates, acrylic (meth)acrylate oligomers, epoxy-functional (meth)acrylate oligomers and combinations thereof.

Exemplary polyester (meth)acrylates include the reaction products of acrylic or methacrylic acid or mixtures thereof with hydroxyl group-terminated polyester polyols. The reaction process may be conducted such that a significant concentration of residual hydroxyl groups remain in the polyester (meth)acrylate or may be conducted such that all or essentially all of the hydroxyl groups of the polyester polyol have been (meth)acrylated. The polyester polyols can be made by polycondensation reactions of polyhydroxyl and polyether polyols and aliphatic and/or aromatic polyester diisocyanates and polyether diisocyanates capped with (meth)acrylate end-groups. Suitable polyurethane (meth) acrylates include, for example, aliphatic polyester-based urethane diacrylate oligomers, aliphatic polyether-based urethane diacrylate oligomers, as well as aliphatic polyester/polyether-based urethane diacrylate oligomers. Aliphatic polyurethane acrylate oligomers useful in the present invention are commercially available from Sartomer (Exton, Pennsylvania), such as the products sold under the designations CN983, CN9001 and CN9004. Other aliphatic urethane acrylate oligomers useful in the present invention include those with high elongation and low $T_g$, such as at least 20° C. below room temperature to aid in the rheological properties of the cured component.

Amounts of Various Constituents

The amounts of the various constituents can vary over a wide range, depending on the desired properties of the curable composition and cured product. In one embodiment in which a low molecular weight oligomer with generally only one polyol segment per oligomer is desired, one might select a molar ratio of polyol segments: polyisocyanates: blocking end groups of 1:2:2, with the polyol segments preferably being difunctional and the polyisocyanates being diisocyanates in such an embodiment. In other embodiments in which a higher molecular weight oligomer is desired, one might select a molar ratio of polyol segments: polyisocyanates: blocking end groups of (4 or 5):(5 or 6):(1 or 2), with the polyol segments preferably being difunctional and the polyisocyanates being diisocyanates in such an embodiment. In cases in which the polyol segments preferably are difunctional and the polyisocyanates are diisocyanates and complete reaction of diisocyanates in the urethane oligomers is desired, the molar ratio of blocking end groups plus polyol backbone segments to diisocyanates is at least d+1:d, wherein d is the number of moles of diisocyanates. The desired amount of component b), the chain terminator or extender, depends on whether b) is a chain terminator or extender and, if a chain extender, its functionality. In general, if full reaction upon deblocking of the blocking end group with exposed isocyanate groups, then the number of functional groups of component b) should be equal, on a molar basis, to the number of blocking end groups previously reacted with an isocyanate group. Thus, for the embodiment in which a chain terminator is used, then the number of moles of chain terminators (which are monofunctional) should be equal to the number of blocking end groups previously reacted with an isocyanate group or a molar ratio of 1:1. For the embodiment in which a difunctional chain extender is used, then the number of moles of such chain extenders should be equal to about one-half of the number of blocking end groups previously reacted with an isocyanate group or a molar ratio of about 1:2. Similarly, for the embodiment in which a trifunctional chain extender is used, then the number of moles of such chain extenders should be equal to about one-third of the number of blocking end groups previously reacted with an isocyanate group or a molar ratio of about 1:3. It should be noted that the polyurethane materials 28b and 28c shown in FIGS. 2b and 2c, respectively, are shown for simplicity as having an end at what appear to be terminal chain extenders. Contrary to these figures, the unit cell would extend in three dimensions and repeat throughout the entire polymer. An excess of polyol results in polyol end-capped oligomers, contrary to that shown in FIGS. 2b and 2c.

If used, the amount of the c) optional at least one monofunctional ethylenically unsaturated monomer or oligomer can vary over a wide range, depending on the amount needed for it to serve its primary purpose(s). Typically, it is used as a diluent and is added primarily to achieve a desired decreased viscosity of the curable composition. Depending on the desired properties and the properties of the constituents, the amount of the a) urethane oligomer may vary between 5-80, preferably between 50-70 and most preferably between 55-65 weight percent and the amount of the at least one monofunctional ethylenically unsaturated monomer or oligomer may vary between 20-60, preferably between 30-50 and most preferably between 35-45 weight percent.

If used, the at least one polyfunctional ethylenically unsaturated monomer or oligomer may vary over a wide range, once again depending on its primary use. In embodiments of the invention, the at least one polyfunctional ethylenically unsaturated monomer or oligomer is present in an amount of 0.1 to 30, preferably 0.2 to 25 and most preferably 1 to 20 weight percent.

If used, the molar ratio of the mixture of the auxiliary oligomer to the chain extender is between about 1:4 to about 1:1, preferably from about 1:3 to about 4:5 and most preferably from about 1:2 to about 3:4.

Photoinitiator

The curable composition of the present invention may further comprise f) a photoinitiator. If the curable composition is to be cured using light, such as ultraviolet light, it will generally be desirable to formulate the composition to include one or more photoinitiators. However, if electron beam or chemical curing is employed, then the curable composition need not contain any photoinitiator.

A photoinitiator is a compound that undergoes a photoreaction on absorption of light, producing reactive species. The reactive species which are generated then initiate polymerization of the reactive components of the curable composition, e.g., the ethylenically unsaturated groups. Generally speaking, when the compounds present in the reactive components contain carbon-carbon double bonds, such polymerization (curing) involves reaction of such carbon-carbon double bonds. The reactive species may be, for example, a free radical species or an anionic species, in various embodiments of the invention. Suitable photoinitiators include, for example, alpha-hydroxy ketones, phenylglyoxylates, benzyldimethylketals, alpha-aminoketones, mono-acyl phosphines, bis-acyl phosphines, metallocenes, phosphine oxides, benzoin ethers and benzophenones and combinations thereof.

Specific examples of suitable photoinitiators include, but are not limited to, 2-methylanthraquinone, 2-ethylanthraquinone, 2-chloroanthraquinone, 2 benzyanthraquinone, 2-t-butylanthraquinone, 1,2-benzo-9,10-anthraquinone, benzyl, benzoin, benzoin methyl ether, benzoin ethyl ether, benzoin isopropyl ether, alpha-methylbenzoin, alpha-phenylbenzoin, Michler's ketone, benzophenone, 4,4'-bis-(diethylamino) benzophenone, acetophenone, 2,2 diethyloxyacetophenone, diethyloxyacetophenone, 2-isopropylthioxanthone, thioxanthone, diethyl thioxanthone, acetylnaphthalenes, ethyl-p-dimethylaminobenzoate, benzil ketone, α-hydroxy keto, 2,4, 6-trimethylbenzoyldiphenyl phosphinoxide, benzyl dimethyl ketal, benzil ketal (2,2-dimethoxy-1,2-diphenylethanone), 1-hydroxycylclohexyl phenyl ketone, 2-methyl-1-[4-(methylthio) phenyl]-2-morpholinopropanone-1,2-hydroxy-2-methyl-1-phenyl-propanone, oligomeric α-hydroxy ketone, phenylbis(2,4,6-trimethylbenzoyl)phosphine oxide, ethyl-4-dimethylamino benzoate, ethyl(2,4,6-trimethylbenzoyl)phenyl phosphinate, anisoin, anthraquinone, anthraquinone-2-sulfonic acid, sodium salt monohydrate, (benzene) tricarbonylchromium, benzil, benzoin isobutyl ether, benzophenone/1-hydroxycyclohexyl phenyl ketone, 50/50 blend, 3,3',4,4'-benzophenonetetracarboxylic dianhydride, 4-benzoylbiphenyl, 2-benzyl-2-(dimethylamino)-4'-morpholinobutyrophenone, 4,4'-bis(diethylamino)benzophenone, 4,4'-bis(dimethylamino)benzophenone, camphorquinone, 2-chlorothioxanthen-9-one, dibenzosuberenone, 4,4'-dihydroxybenzophenone, 2,2-dimethoxy-2-phenylacetophenone, 4-(dimethylamino)benzophenone, 4,4'-dimethylbenzil, 2,5-dimethylbenzophenone, 3,4-dimethylbenzophenone, diphenyl(2,4,6-trimethylbenzoyl)phosphine oxide/2-hydroxy-2-methylpropiophenone, 50/50 blend, 4'-ethoxyacetophenone, 2,4,6-trimethylbenzoyldiphenylphophine oxide, phenyl bis(2,4,6-trimethyl benzoyl) phosphine oxide, ferrocene, 3'-hydroxyacetophenone, 4'-hydroxyacetophenone, 3-hydroxybenzophenone, 4-hydroxybenzophenone, 1-hydroxycyclohexyl phenyl ketone, 2-hydroxy-2-methylpropiophenone, 2-methylbenzophenone, 3-methylbenzophenone, methybenzoylformate, 2-methyl-4'-(methylthio)-2-morpholinopropiophenone, phenanthrenequinone, 4'-phenoxyacetophenone, (cumene) cyclopentadienyl iron(ii) hexafluorophosphate, 9,10-diethoxy and 9,10-dibutoxyanthracene, 2-ethyl-9,10-dimethoxyanthracene, thioxanthen-9-one and combinations thereof.

Exemplary combinations of suitable photoinitiators include blends of 2-hydroxy-2-methyl-1-phenyl-1-propanone, 2,4,6-trimethylbenzoylphenylphosphinic acid ethyl ester and phenylbis(2,4,6-trimethylbenzoyl) phosphine oxide and blends of 2-hydroxy-2-methyl-1-phenyl-1-propanone and diphenyl (2,4,6-trimethylbenzoyl) phosphine oxide.

Also useful in the present invention are organometallic titanocene photoinitiators such as Irgacure® 784 bis(.eta.5-2,4-cyclopentadien-1-yl)-bis(2,6-difluoro-3-(1H-pyrrol-1-yl)-phenyl) titanium.

If a photoinitiator is employed in the curable composition, it may generally be present in a total concentration of up to about 15% by weight based on the total weight of the curable composition (e.g., a concentration of from about 0.1 to about 5% by weight based on the total weight of the curable composition).

Other Components of the Curable Compositions

The curable compositions of the present invention may optionally contain one or more additives instead of or in addition to the above-mentioned components. Such additives include, but are not limited to, antioxidants, ultraviolet absorbers, photostabilizers, foam inhibitors, flow or leveling agents, colorants, pigments, dispersants (wetting agents), slip additives, fillers (other than or in addition to inorganic nanoparticles), thixotropic agents, matting agents, accelerators, adhesion promoters (such as acidic adhesion promoters), thermoplastics and other types of polymers (other than or in addition to the above-described block copolymers), waxes or other various additives, including any of the additives conventionally utilized in the coating, sealant, adhesive, molding or ink arts.

Method of Making the Curable Composition

The curable compositions of the present invention may be made in any conventional manner as is known in the art. In one embodiment, the curable composition is made by first mixing a reactive diluent (e.g., a monomer, namely one of component c)) and a polyol (i.e., component a)). Then, a catalyst and inhibitors may be added. The mixture may then be sparged with air to allow it to homogenize and fully mix together. Then, the polyisocyanate is added to allow an exothermic reaction to occur in which the polyol and polyisocyanate react in a step growth polymerization reaction. The mixture may then be held at 60-80° C. to allow for the reaction to reach critical conversion of all of the polyol backbone segments to be consumed. Next, the blocking end groups are added to end cap the desired amount of unreacted polyisocyanate ends (or a portion of thereof). Finally, residual polyol is added to consume any free isocyanate groups, leaving excess polyol.

Curing of the Curable Composition

Curing of the curable compositions in accordance with the present invention may be carried out by any suitable method, such as free radical, cationic and/or anionic polymerization. One or more initiators, such as a free radical initiator (e.g., photoinitiator, peroxide initiator) may be present in the curable composition. Prior to curing, the curable composition may be applied to a substrate surface in any known conventional manner, for example, by spraying, knife coating, roller coating, casting, drum coating, dipping and the like and combinations thereof. Indirect application using a transfer process may also be used. A substrate may be any commercially relevant substrate, such as a high surface energy substrate or a low surface energy substrate, such as a metal substrate or plastic substrate, respectively. The substrates may comprise metal, paper, cardboard, glass, thermoplastics such as polyolefins, polycarbonate, acrylonitrile butadiene styrene (ABS) and blends thereof, composites, wood, leather and combinations thereof. When used as an adhesive, the composition may be placed between two substrates and then cured, the cured composition thereby bonding the substrates together.

Curing may be accelerated or facilitated by supplying energy to the composition, such as by heating the composition and/or by exposing the composition to a radiation source, such as visible or UV light, infrared radiation and/or electron beam radiation. Thus, the cured composition may be deemed the reaction product of the curable composition, formed by curing.

The curable compositions of the present invention are particularly well suited to being cured using LED (Light Emitting Diode) curing (e.g., UV LED curing, using radiation from a UV LED device) and for use in high speed applications.

Methods of Use

The curable compositions of the present invention are useful as adhesives, in particular as adhesives that need to have one set of adhesive properties upon curing and then another set upon exposure to some external stimuli. The type of adhesives may vary over a wide range, such as UV-curable laminating adhesives, UV-curable hotmelt adhesives and pressure-sensitive adhesives, among other potential applications. A method for bonding two substrates with an adhesive comprises the steps of: applying an adhesive composition to a first substrate; curing the adhesive composition to impart a first set of adhesive properties to the adhesive; contacting a second substrate with the cured adhesive to bond the second substrate with the first substrate and externally stimulating the cured composition to impart a second set of adhesive properties to the adhesive, different from the first set of adhesive properties. As used herein, "adhesive properties" refer to the tack, shear strength and peel strength of an adhesive.

In the embodiment of the method for using the curable composition as an adhesive, the curable composition may comprise: curable composition comprises:
  a) at least one urethane (meth)acrylate oligomer having a structure comprising:
    a1) at least one polyol backbone segment having at least one reacted end;
    a2) at least one reacted polyisocyanate forming a urethane linkage at the at least one reacted end of each of said at least one polyol backbone segment and
    a3) at least one blocking end group reacted with said at least one reacted polyisocyanate to form a reversible bond and wherein said at least one blocking end group bears a (meth)acrylate group;
  b) either:
    b1) a monofunctional chain terminator or
    b2) a polyfunctional chain extender and
  c) optionally, at least one monofunctional ethylenically unsaturated monomer or oligomer different from a).

Preferably, the polyol may be any known polyol, including polyester, polyether, polycaprolactone, polycarbonate, polybutadiene, polydimethylsiloxane and polyfarmasene and combinations thereof. In other embodiments, the polyol excludes polyether or is selected from the group consisting of polyester, polycaprolactone, polycarbonate, polybutadiene, polydimethylsiloxane and polyfarmasene. In other embodiments, the at least one polyol backbone segment consists essentially of, or consists of, polyester. The at least one polyol backbone segment may be branched or linear and can be substituted or not. Specific examples include triethanolamine, JEFFAMINE T Series and trimethylol propane. In certain other embodiments in which b) is the chain extender, the mixture of urethane (meth)acrylate oligomers has a molecular weight distribution wherein the $MW_{10}$ is in the range of 800 to 1,500 g/mol, the $MW_{90}$ is in the range of 6,000 to 12,000 g/mol, the number average molecular weight is in the range of 3,000 to 5,000 g/mol and the distribution has two primary peaks, a lower molecular weight peak in a range of 800 to 1,500 g/mol and a higher molecular weight peak in a range of 6,000 to 12,000 g/mol. Preferably, the number average molecular weight is in the range of 2,000 to 25,000 g/mol, more preferably 2,500 to 12,000 g/mol, even more preferably 2,500 to 8,000 g/mol, still more preferably 2,750 to 7,000 and most preferably 3,000 to 6,000 g/mol. Methods of using the curable composition as an adhesive can be used with any adhesive of the present invention described herein.

In one embodiment, the first set of adhesive properties comprises high peel strength and high shear strength and the second set of adhesive properties comprises a reduced value, relative to the first set, of at least one of the peel strength and the shear strength and the method further comprises, after the externally stimulating step, separating the first substrate and the second substrate, wherein b) is the chain terminator. Such an adhesive might be used if it is desired to make an adhesive easier for delamination by exposure to some external stimuli in a controlled way. For example, if might be desirable to use this for a window that must be removed from a frame periodically. A further aspect of this embodiment comprises, after the externally stimulating step and before the separating step, applying a solvent to the cured composition. Such a solvent may further facilitate separation of the first substrate from the second substrate by dissolving some or all of the adhesive, which might be rendered more soluble by the external stimuli.

In another embodiment for using an adhesive, the first set of adhesive properties comprises peel strength and shear strength sufficient to permit adjustment of the first substrate relative to the second substrate and the second set of adhesive properties comprises an increased value at least one of the peel strength or the shear strength, relative to the first set, to form a stronger bond between the first and second substrate. Thus, the second set of adhesive properties may prevent relative movement under typical forces, such as gravitational force. The method of this embodiment further comprises, after the curing step and before the externally stimulating step, adjusting the position of the first substrate relative to the second substrate to provide an adjusted relative position of the first substrate and the second substrate, wherein b) is the chain extender. This embodiment could be particularly useful if mounting wall tile to a wall or tile to a floor, which needs to be adjusted precisely, allowing for adjustment before the application of the external stimuli, such as heat. Preferably, while externally stimulating the cured composition, the first substrate and the second substrate are retained in the adjusted relative position.

In another embodiment for using an adhesive, the first set of adhesive properties comprises peel strength and shear strength sufficient to adhere the adhesive, at low tack, to the first substrate and wherein the second set of properties allows for bonding of the first substrate to the second substrate, whereby the second set of properties includes increased shear and peel strengths of the adhesive and about the same tack as the first set of properties, wherein b) is chain extender and is polyfunctional. In this or other embodiments of the methods described herein, it might be desirable to use a curable composition which undergoes a deblocking reaction upon the external stimuli to expose isocyanates which could then react with hydroxyl groups in the layer to be adhered thereto; in this way, a urethane bond may be formed across two adjacent layers to reinforce the adhesive bond between two such layers. For example, such layers might include one interlayer of a shoe in which a material undergoes the deblocking reaction upon exposure to the external stimuli and an adjacent layer, to be adhered to the first layer, containing polyvinyl alcohol.

In any or all of these embodiments of using an adhesive, the curing step may comprise exposing the curable composition to ultraviolet energy or exposing the curable composition to electron beam energy. Also, the externally stimulating step may comprise annealing the cured composition. In embodiments of the invention, the annealing step comprises heating the cured composition at a temperature of between about 75'C and about 125'C for a time of between about 1 and about 3 hours, preferably at about 100° C. for about 2 hours.

Embodiments of the invention include the use of any curable composition described herein (including those curable compositions described in connection with the method of use embodiment) as an adhesive, such as a pressure-sensitive adhesive, more preferably a radiation-curable pressure-sensitive adhesive. Embodiments of the invention include the use of any curable composition described herein as for a pressure-sensitive adhesive in the field of medical, packaging, construction, hygiene materials. Embodiments of the invention further comprise an adhesive, preferably a pressure-sensitive adhesive, resulting from curing any curable composition described herein.

Exemplary Aspects of the Invention

Various non-limiting aspects of the present invention may be summarized as follows:

Aspect 1: A curable composition comprising:
a) at least one urethane (meth)acrylate oligomer having a structure comprising:
 a1) at least one polyol backbone segment having at least one reacted end, wherein the polyol comprises a polyester;
 a2) at least one reacted polyisocyanate forming a urethane linkage at the at least one reacted end of each of said at least one polyol backbone segment and
 a3) at least one blocking end group reacted with said at least one reacted polyisocyanate to form a reversible bond and wherein said at least one blocking end group bears a (meth)acrylate group;
b) either:
 b1) a monofunctional chain terminator or
 b2) a polyfunctional chain extender and
c) optionally, at least one monofunctional ethylenically unsaturated monomer or oligomer different from a),
wherein the at least one urethane (meth)acrylate oligomer has a molecular weight distribution having two primary peaks comprising a lower molecular weight peak in a range of 800 to 1,500 g/mol and a higher molecular weight peak in a range of 6,000 to 12,000 g/mol.

Aspect 2: The curable composition of Aspect 1, wherein b) is the chain extender b2) and the number average molecular weight of the at least one urethane (meth)acrylate oligomer is at least 3,000 g/mol, preferably at least 4,000 g/mol and most preferably at least 5,000 g/mol.

Aspect 3: The curable composition of Aspect 1 or 2, wherein b) is the chain extender b2) and the at least one urethane (meth)acrylate oligomer has a molecular weight distribution wherein the $MW_{10}$ is in the range of 800 to 1,500 g/mol, the $MW_{90}$ is in the range of 6,000 to 12,000 g/mol, the number average molecular weight is in the range of 3,000 to 5,000 g/mol.

Aspect 4: The composition of any of Aspects 1-3, wherein the at least one blocking end group comprises, prior to reaction with the polyisocyanate, a functional group adapted to form the reversible bond with the polyisocyanate selected from the group consisting of alcohols, phenols, pyridinols, oximes, thiophenols, mercaptans, amides, cyclic amides, imides, imidazoles, imidazolines, pyrazoles, triazoles, amidines, hydroxamic acid esters, uretdiones and sterically hindered amines.

Aspect 5: The composition of any of Aspects 1-3, wherein the at least one blocking end group is tert-butyl aminoethyl methacrylate (t-BAEMA) and the reversible bond is a urea bond.

Aspect 6: The composition of any of Aspects 1-5, wherein the polyisocyanate is a diisocyanate and preferably is selected from the group consisting of isophorone diisocyanate, toluene diisocyanate, hexamethylene diisocyanate, trimethylhexamethylene diisocyanate and dicyclohexylmethane-4,4'-diisocyanate.

Aspect 7: The composition of any of Aspects 1 or 4-6, wherein b) is the chain terminator b 1), wherein b 1) bears a reactive group and the reactive group is selected from the group consisting of alcohols, amines and thiols, preferably a primary alcohol or a primary amine.

Aspect 8: The composition of any of Aspects 1-6, wherein b) is the chain extender b2) and the chain extender is difunctional or trifunctional.

Aspect 9: The composition of Aspect 8, wherein the chain extender is difunctional and comprises polypropylene glycol or polypropylene diamine.

Aspect 10: The composition of Aspect 8, wherein the chain extender is trifunctional and comprises triethanol amine.

Aspect 11: The composition of any of Aspects 1-10 comprising the at least one monofunctional ethylenically unsaturated monomer or oligomer c), wherein the at least one monofunctional ethylenically unsaturated monomer or oligomer c) comprises at least one monofunctional (meth)acrylate monomer and the at least one monofunctional (meth)acrylate monomer comprises a low Tg monofunctional (meth)acrylate monomer, preferably selected from the group consisting of butyl acrylate, octyl acrylate, iso-octyl acrylate(2-ethyl hexyl acrylate), decyl-acrylate, isodecyl acrylate, ethoxylate tetrahydrofuryl acrylate, tert-butyl acrylate and tert-butyl methacrylate.

Aspect 12: The composition of any of Aspects 1-10 comprising the at least one monofunctional ethylenically unsaturated monomer or oligomer c), wherein the at least one monofunctional ethylenically unsaturated monomer or oligomer c) comprises at least one monofunctional (meth) acrylate monomer, wherein the at least one monofunctional (meth)acrylate comprises a high Tg monofunctional (meth) acrylate monomer, preferably bearing at least one cycloaliphatic group.

Aspect 13: The composition of any of Aspects 1-12 further comprising e) an auxiliary oligomer having end groups that are more thermodynamically stable with isocyanate groups than b) is with isocyanate groups under the conditions of the external stimuli.

Aspect 14: The composition of Aspect 13, wherein the auxiliary oligomer e) comprises a urethane (meth)acrylate which is different from a).

Aspect 15: The composition of Aspects 13 or 14, wherein the molar ratio of the mixture of the auxiliary oligomer e) to b) is between about 1:4 to about 1:1, preferably from about 1:3 to about 4:5 and most preferably from about 1:2 to about 3:4.

Aspect 16: The composition of any of Aspects 1-15 further comprising f) a photoinitiator.

Aspect 17: The composition of any of Aspects 1-16, wherein the polyester comprises a blend of a high molecular weight polyester and a low molecular weight polyester and the ratio of high molecular weight polyester to low molecular weight polyester ranges from about 1:8 to 3:1, preferably 1:4 to 2:1, most preferably 3:10 to 1:1.

Aspect 18: The composition of any of Aspects 1, 4-6 or 11-17, wherein b) is the chain extender b2) and the chain extender comprises a difunctional reactant and a trifunctional reactant, wherein the weight ratio of the trifunctional reactant to the difunctional reactant is between about 1:1,000 and about 1:20, preferably between about 1:200 and about 1:40, most preferably between about 1:150 and about 1:40.

Aspect 19: The composition of any of Aspects 1-18, wherein the at least one urethane (meth)acrylate oligomer a) comprises a plurality of said oligomers and all of said oligomers have a blocking end group at each of the ends of the oligomers.

Aspect 20: The composition of any of Aspects 1-18, wherein the at least one urethane (meth)acrylate oligomer a) comprises a plurality of said oligomers and the plurality comprises: (i) a first set of said oligomers having one blocking end group at least one of the ends of the oligomer and having one of said at least one polyol backbone segments with an unreacted end at least one of the ends of the oligomer and (ii) a second set of said oligomers having a blocking end group at each of the ends of the oligomer.

Aspect 21: The composition of Aspect 20, wherein X denotes the number of reacted blocking end groups divided by the number of oligomers in the mixture and wherein X is between 1 and about 3, preferably between about 1.25 and about 2.25 and most preferably between about 1.8 and 1.99.

Aspect 22: The composition of any of Aspects 1-21, wherein the polyol backbone segment has a functionality of at least two, preferably between 2 to 4 and most preferably is difunctional.

Aspect 23: A method for bonding two substrates with an adhesive comprising the steps of:
applying a curable composition to a first substrate, wherein the curable composition comprises:
  a) at least one urethane (meth)acrylate oligomer having a structure comprising:
    a1) at least one polyol backbone segment having at least one reacted end;
    a2) at least one reacted polyisocyanate forming a urethane linkage at the at least one reacted end of each of said at least one polyol backbone segment and
    a3) at least one blocking end group reacted with said at least one reacted polyisocyanate to form a reversible bond, and wherein said at least one blocking end group bears a (meth)acrylate group;
  b) either:
    b1) a monofunctional chain terminator or
    b2) a polyfunctional chain extender and
  c) optionally, at least one monofunctional ethylenically unsaturated monomer or oligomer different from a);
curing the curable composition to form the adhesive having a first set of adhesive properties;
contacting a second substrate with the adhesive to bond the second substrate with the first substrate and externally stimulating the cured composition to impart a second set of adhesive properties to the adhesive, different from the first set of adhesive properties.

Aspect 24: The method of Aspect 23, wherein the polyol is selected from the group consisting of polyester, polyether, polycaprolactone, polycarbonate, polybutadiene, polydimethylsiloxane and polyfarmasene and combinations thereof.

Aspect 25: The method of Aspect 24, wherein the first set of adhesive properties comprises high peel strength and high shear strength and the second set of adhesive properties comprises a reduced value, relative to the first set, of at least one of the peel strength and the shear strength and the method further comprises, after the externally stimulating step, separating the first substrate and the second substrate, wherein b) is the chain terminator b1).

Aspect 26: The method of Aspect 25 further comprising, after the externally stimulating step and before the separating step, applying a solvent to the cured composition.

Aspect 27: The method of Aspects 23 or 24, wherein the first set comprises peel strength and shear strength sufficient to permit adjustment of the first substrate relative to the second substrate and the second set comprises an increased value at least one of the peel strength or the shear strength, relative to the first set, to form a stronger bond between the first and second substrate, and the method further comprises, after the curing step and before the externally stimulating step, adjusting the position of the first substrate relative to the second substrate to provide an adjusted relative position of the first substrate and the second substrate, wherein b) is the chain extender b2).

Aspect 28: The method of Aspects 23 or 24, wherein the first set of properties comprises peel strength and shear strength sufficient to adhere the adhesive, at low tack, to the first substrate and wherein the second set of properties allows for bonding of the first substrate to the second substrate, wherein b) is the chain extender b2).

Aspect 29: The method of any of Aspects 23-28, wherein the curing step comprises exposing the curable composition to ultraviolet energy or exposing the curable composition to electron beam energy.

Aspect 30: The method of any of Aspects 23-29, wherein the externally stimulating step comprises annealing the cured composition, preferably comprising heating the cured composition at a temperature of between about 75'C and about 125'C for a time of between about 1 and 3 hours.

Aspect 31: Use of a curable composition as an adhesive wherein the curable composition comprises:
a) at least one urethane (meth)acrylate oligomer having a structure comprising:
   a1) at least one polyol backbone segment having at least one reacted end;
   a2) at least one reacted polyisocyanate forming a urethane linkage at the at least one reacted end of each of said at least one polyol backbone segment and
   a3) at least one blocking end group reacted with said at least one reacted polyisocyanate to form a reversible bond and wherein said at least one blocking end group bears a (meth)acrylate group;
b) either:
   b1) a monofunctional chain terminator or
   b2) a polyfunctional chain extender and
c) optionally, at least one monofunctional ethylenically unsaturated monomer or oligomer different from a).

Aspect 32: The use of Aspect 31, wherein it is for a pressure-sensitive adhesive, preferably for a radiation-curable pressure-sensitive adhesive.

Aspect 33: The use of Aspects 31 or 32, wherein it is for a pressure-sensitive adhesive in the field of medical, packaging, construction, hygiene materials.

Aspect 34: An adhesive, preferably a pressure-sensitive adhesive, wherein it results from curing the composition of any of Aspects 1-22 or wherein it results from the method of any of Aspects 23-30 or from the use of any of Aspects 31-33.

Within this specification, embodiments have been described in a way which enables a clear and concise specification to be written, but it is intended and will be appreciated that embodiments may be variously combined or separated without departing from the invention. For example, it will be appreciated that all preferred features described herein are applicable to all aspects of the invention described herein.

In some embodiments, the invention herein can be construed as excluding any element or process step that does not materially affect the basic and novel characteristics of the curable composition or process using the curable composition. Additionally, in some embodiments, the invention can be construed as excluding any element or process step not specified herein.

Although the invention is illustrated and described herein with reference to specific embodiments, the invention is not intended to be limited to the details shown. Rather, various modifications may be made in the details within the scope and range of equivalents of the claims and without departing from the invention. Furthermore, where various ranges of a constituent or property are provided, the invention includes ranges starting with a lower limit of a first range and extending to an upper limit of a second range.

EXAMPLES

To synthesize the deblockable, radiation curable adhesive oligomers, the following procedure was performed. For a high molecular weight oligomer, 200 g of isobornyl acrylate were charged into a reactor, followed by 659.37 g of Piothane, 2,000 g of polyester polyol, 1.04 g of a bismuth carboxylate catalyst to facilitate the OH—OCN reaction, along with an inhibitor package. The reaction kettle was sparged for 30 min with dried air and heated to 60° C. 109.94 g of isophorone diisocyanate was added gradually to the reactor and an exotherm to 80° C. was observed. Reaction was allowed to proceed until isocyanate concentration had reached equilibrium, after which 28.25 g of tert-butyl amino ethyl methacrylate was added to the reactor and a secondary exotherm was observed.

Smaller molecular weight deblockable polyurethane-urea materials were made by charging 265.6 g fomrez 55-225 polyester polyol into the reactor kettle. An inhibitor, 1.05 g the same bismuth carboxylate catalyst and 300 g of 3,3,5 trimethylcyclohexyl acrylate were added. The reactor was then heated and sparged with air and agitated. After 30 min, 237 g of isophorone diisocyate were gradually added and the reactor temperature was allowed to exotherm to 80° C. Once the initial polyol isocyanate reaction was complete, 198 g of tert butyl aminoethyl methacrylate were added to the reactor.

A UV curable composition was formulated by initially weighing out 30 grams of the composition described in paragraph 1 followed by an additional 30 g of the material described in paragraph 2. 17.7 g of the diamine Jeffamine 2000, 15 g of isodecyl acrylate and 25 g of isobornyl acrylate were added next. Lastly, 5 g of the photoinitiator Irgacure 2022 was added. The resulting composition was then mixed using a flak tek. The adhesive composition was then cast as a 2 mil film and cured using a medium pressure mercury arc lamp at 50 feet per minute. The thermal deblocking took place after the adhesive had been UV cured and applied to a secondary substrate by heating at 100° C. for 2 hrs.

Formulations 1-4 were comprised as follows:

| | High MW Polyester Deblockable Oligomer | Low MW Polyester Deblockable Oligomer | Chain extender | Low Tg reactive Diluent | High Tg reactive diluent | Photoinitiator |
|---|---|---|---|---|---|---|
| 1 | Oligomer 1 (30%) | Oligomer 2 (30%) | Jeffamine D 2000 (17.7%) | Isodecyl acrylate (15%) | Isobornyl acrylate (25%) | Irgacure 2022 (5%) |
| 2 | Oligomer 1 (25%) | Oligomer 2 (35%) | Jeffamine D 2000 (18.75%) | Isodecyl acrylate (15%) | Isobornyl acrylate (25%) | Irgacure 2022 (5%) |
| 3 | Oligomer 1 (35%) | Oligomer 2 (25%) | Jeffamine D 2000 (16.6446%) + Triethanolamine (0.0054 wt %) | Isodecyl acrylate (15%) | Isobornyl acrylate (25%) | Irgacure 2022 (5%) |
| 4 | Oligomer 1 (35%) | Oligomer 2 (25%) | Jeffamine D 2000 (16.6393%) + Triethanolamine (0.0107%) | Isodecyl acrylate (15%) | Isobornyl acrylate (25%) | Irgacure 2022 (5%) |

Oligomer 1, a high molecular weight polyester deblockable oligomer, was made as described above in paragraph 1 and had a molecular weight of about 8,000-11,000 g/mol. Oligomer 2, a low molecular weight polyester deblockable oligomer, was made as described above in paragraph 2 and had a molecular weight of about 1,500-2,000 g/mol.

The results of testing for tack, shear and peel of Formulations 1-4 are shown below in Table 1. Tack testing was performed using a PT-1000 probe tack tester. In this test, a 1"×1" sample of the UV cured adhesive was applied to the t-1000 probe tack test. A stainless steel rod then probes the surface and the force required to remove the probe from the tester was measured. In the case of an anneal, the adhesive sample was placed in an oven at 100° C. for 2 hrs then removed and applied to the substrate. Once applied, the same testing was carried out.

After UV and/or Thermal curing, shear testing was performed by applying an adhesive strip to a stainless steel panel and allowed to dwell for 1 hr. After the dwell time, the stainless steel panel and the sample were secured to a shear testing apparatus. A 1 kg weight was then suspended from the adhesive sample. The shear tester records the time for the 1 kg weight to fall from the secured stainless steel panel.

Peel testing was performed using both stainless steel and polypropylene oxide substrates. A 1" by 4" strip was applied to both stainless steel and polypropylene and allowed to dwell for 24 hrs. After 24 hours, the substrate was affixed in the bottom clamp of a tensile tester with the adhesive portion affixed to the top clamp. The tester then removed the adhesive at the rate of 1 foot per minute at 180° and the force required to remove the sample was recorded and reported.

In the tests conducted below and shown on FIGS. 3a-6b, a 2.5 mil thick layer of the photocurable resin was applied to the substrate and cured at 400 mW at 50 fpm. A release liner was then placed on top of the adhesive and the substrate was cut into one inch wide strips. Peel and shear were determined slightly differently compared to the values reported in Table 1, as explained below.

Peel: Once UV cured, a strip, usually six inches long, was applied to either a polypropylene or stainless steel substrate and allowed to dwell for 1 day. The force require to remove the strip was then measured via an instron. In the case of anneal, the adhesive sample was placed in an oven at 100° C. for 2 hrs then removed and applied to the substrate. Once applied, the same testing was carried out, 1 day dwell followed by removal by instron at a removal rate of 1 ft/min and at an angle of 180°.

Shear: Post UV curing a 1"×1" square was applied to a stainless steel surface with a shear hanger attached. Once in place on the shear tester a 2 kg weight was applied. Time was measured from the point the weight was applied to when the weight fell down and the time of the test was recorded. In the case of anneal, the adhesive sample was placed in an oven at 100° C. for 2 hrs then removed and applied to the substrate. Once applied, the same testing was carried out.

A blend of high and low molecular weight polyester based oligomers were UV cured and annealed as described above. The high molecular weight material had a MW of approximately 8-11,000 g/mol and the lower molecular weight oligomer had an MW targeting 1,500-2,000 g/mol. All FIG. 3 data was obtained using Formulation 1. As shown in FIGS. 3a and 3b, peel tests show significant improvement after

TABLE 1

| Formulation | Tack before | Tack after | Shear before (1 kg) (mm) | Shear after (1 kg) (mm) | Peel SS before | Peel PP before | Peel SS after | Peel PP after | SAFT before | SAFT after |
|---|---|---|---|---|---|---|---|---|---|---|
| 1 | 0.499 | 0.46 | 2727.2 | 24396 | 6.91 | 6.12 | 10.5 | 11 | 75 | 59 |
| 2 | 1.142 | 0.95 | 3201.4 | 51000 | 6.67 | 5.92 | 9.5 | 8.58 | 77 | 44 |
| 3 | 1.8 | 0.09 | 4633.4 | 9747.3 | 7.49 | 5.37 | 7.28-8.25 | 7.76 | 70 | 100 |
| 4 | 2.25 | 0.08 | 3352.1 | 36265 | 7.18 | 6.13 | 6.95-7.75 | 6.76-8.20 | 70 | 108 | thermal cure of the polyester oligomers (namely from less than 0.1 lbf to over 3.5 lbf). Further, shear strength improved significantly from about 0.1 min to about 3 min after the thermal cure.

Blends of high and low molecular weight oligomers (Formulations 1 and 2) were peel tested after UV curing and annealing. As shown in FIG. 3a, both samples showed significant improvement after the thermal cure, going from about 7 lbf with only UV curing to about 10 lbf for both the 1:1 and 5:7 (high:low) blends.

Blends of high and low molecular weight oligomers (Formulations 1 and 2) were shear tested after UV curing and annealing. As shown in FIG. 3b, both samples provide results starting from roughly 1-2 days with only UV curing to over 2 weeks for the 1:1 blend with annealing and to over a month with the 5:7 (high:low) blend.

Blends of high and low molecular weight oligomers were tack tested after UV curing and after thermal annealing. As shown in FIG. 3c, the samples with a higher concentration of high MW oligomer show roughly half the tack, both after UV curing and annealing, compared to the 5:7 blend.

The blends tested in FIGS. 5a-5c were made except either 0.5 or 1% (by mole) of the PPG chain extender was replaced with triethanol amine as provided in Formulations 3 and 4. As shown in FIG. 5a, the samples still show high peel (greater than 7 lbf) after UV and thermal annealing. The introduction of triethanol amine limits the formation of thermoplastic urethanes and thus decreases the extent to which the peel increases after annealing.

As shown in FIG. 5b, shear testing was performed as described above on Formulations 3 and 4. Both samples show low shear after UV curing. The 0.5 mol % sample shows decreased performance; however, it appears that the inclusion of 1 mol % triethanol amine may be sufficient to make an interpenetrating network which dramatically increased the shear strength of these materials.

As shown in FIG. 5c, probe tack testing was done as before on Formulations 3 and 4. Both sets of material show high tack after UV curing but a dramatic decrease in tack after thermal annealing. This is likely due to the crosslinking now present in the thermoplastic network which would limit the rheology of the material and drop the tack.

Figure 6A:
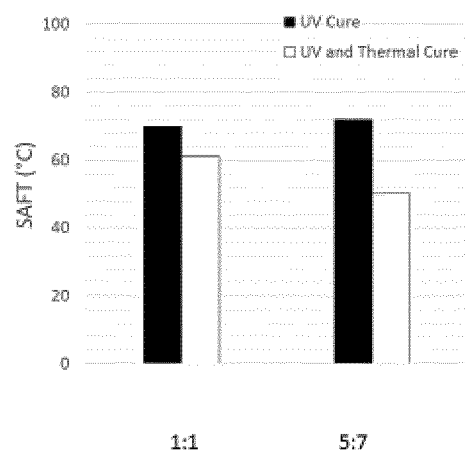
FIGS. 6a and 6b show the SAFT of the blends of FIGS. 4a-4c and 5a-5c, respectively.

As shown in FIG. 6a, shear adhesion failure temperatures for different blends of polyester based oligomers were examined. Both samples, Formulations 3 and 4 show similar failures after UV curing; however, after annealing, the sample with longer thermoplastic urethane segments decreases much more.

Figure 6B:
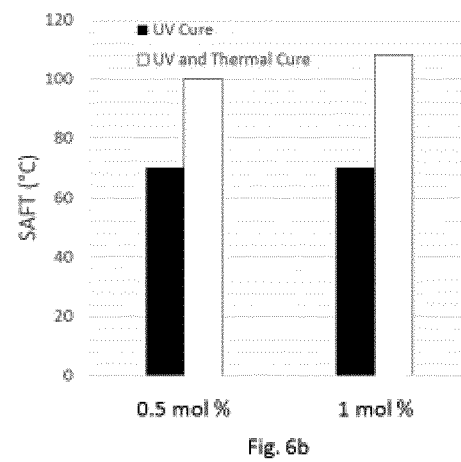

As shown in FIG. 6b, shear adhesion failure temperatures for Formulations 5 and 6 with 0.5 and 1 mol % chain extender were examined. When the chain extender allows for crosslinking during the annealing step, these materials show increased failure temperatures.

The invention claimed is:

1. An adhesive comprising a cured composition resulting from curing a curable composition comprising:
   a) at least one urethane (meth)acrylate oligomer having a structure comprising:
      a1) at least one polyol backbone segment having at least one reacted end, wherein the polyol comprises a polyester;
      a2) at least one reacted polyisocyanate forming a urethane linkage at the at least one reacted end of each of said at least one polyol backbone segment; and
      a3) at least one blocking end group reacted with said at least one reacted polyisocyanate to form a reversible bond and wherein said at least one blocking end group bears a (meth)acrylate group;
   b) either:
      b1) a monofunctional chain terminator or
      b2) a polyfunctional chain extender and
   c) optionally, at least one monofunctional ethylenically unsaturated monomer or oligomer different from a),
   wherein the at least one urethane (meth)acrylate oligomer has a molecular weight distribution having two primary peaks comprising a lower molecular weight peak in a range of 800 to 1,500 g/mol and a higher molecular weight peak in a range of 6,000 to 12,000 g/mol.

2. The adhesive of claim 1, wherein b) is the chain extender b2) and the number average molecular weight of the at least one urethane (meth)acrylate oligomer is at least 3,000 g/mol.

3. The adhesive of claim 1, wherein b) is the chain extender b2) and the at least one urethane (meth)acrylate oligomer has a molecular weight distribution wherein the $MW_{10}$ is in the range of 800 to 1,500 g/mol, the $MW_{90}$ is in the range of 6,000 to 12,000 g/mol, the number average molecular weight is in the range of 3,000 to 5,000 g/mol.

4. The adhesive of claim 1, wherein the at least one blocking end group comprises, prior to reaction with the polyisocyanate, a functional group adapted to form the reversible bond with the polyisocyanate selected from the group consisting of alcohols, phenols, pyridinols, oximes, thiophenols, mercaptans, amides, cyclic amides, imides, imidazoles, imidazolines, pyrazoles, triazoles, amidines, hydroxamic acid esters, uretdiones and sterically hindered amines.

5. The adhesive of claim 1, wherein the at least one blocking end group is tert-butyl aminoethyl methacrylate (t-BAEMA) and the reversible bond is a urea bond.

6. The adhesive of claim 1, wherein the polyisocyanate is a diisocyanate.

7. The adhesive of claim 6, wherein the diisocyanate is selected from the group consisting of isophorone diisocyanate, toluene diisocyanate, hexamethylene diisocyanate, trimethylhexamethylene diisocyanate and dicyclohexylmethane-4,4'-diisocyanate.

8. The adhesive of claim 1, wherein b) is the chain terminator b1), wherein b1) bears a reactive group and the reactive group is selected from the group consisting of alcohols, amines and thiols.

9. The adhesive of claim 8, wherein the reactive group is a primary alcohol or a primary amine.

10. The adhesive of claim 1, wherein b) is the chain extender b2) and the chain extender is difunctional or trifunctional.

11. The adhesive of claim 10, wherein the chain extender b2) is difunctional and comprises polypropylene glycol or polypropylene diamine.

12. The adhesive of claim 10, wherein the chain extender b2) is trifunctional and comprises triethanol amine.

13. The adhesive of claim 1 comprising the at least one monofunctional ethylenically unsaturated monomer or oligomer c), wherein the at least one monofunctional ethylenically unsaturated monomer or oligomer c) comprises at least one monofunctional (meth)acrylate monomer and the at least one monofunctional (meth)acrylate monomer comprises a low Tg monofunctional (meth)acrylate monomer.

14. The adhesive of claim 13, wherein the low Tg monofunctional (meth)acrylate monomer is selected from the group consisting of butyl acrylate, octyl acrylate, iso-octyl acrylate(2-ethyl hexyl acrylate), decyl-acrylate, isodecyl acrylate, ethoxylate tetrahydrofuryl acrylate, tert-butyl acrylate and tert-butyl methacrylate.

15. The adhesive of claim 1 comprising the at least one monofunctional ethylenically unsaturated monomer or oligomer c), wherein the at least one monofunctional ethylenically unsaturated monomer or oligomer c) comprises at least one monofunctional (meth)acrylate monomer, wherein the at least one monofunctional (meth)acrylate comprises a high Tg monofunctional (meth)acrylate monomer.

16. The adhesive of claim 15, wherein the high Tg monofunctional (meth)acrylate monomer comprises a monofunctional (meth)acrylate bearing at least one cycloaliphatic group.

17. The adhesive of claim 1 further comprising d) at least one polyfunctional ethylenically unsaturated monomer or oligomer.

18. The adhesive of claim 1 further comprising e) an auxiliary oligomer having end groups that are more thermodynamically stable with isocyanate groups than b) is with isocyanate groups under the conditions of the external stimuli.

19. The adhesive of claim 18, wherein the auxiliary oligomer e) comprises a urethane (meth)acrylate which is different from a).

20. The adhesive of claim 19, wherein the molar ratio of the mixture of the auxiliary oligomer e) to b) is between about 1:4 to about 1:1.

21. The adhesive of claim 1 further comprising f) a photoinitiator.

22. The adhesive of claim 1, wherein the polyester comprises a blend of a high molecular weight polyester and a low molecular weight polyester and the ratio of high molecular weight polyester to low molecular weight polyester ranges from about 1:8 to 3:1.

23. The adhesive of claim 1, wherein b) is the chain extender b2) and the chain extender comprises a difunctional reactant and a trifunctional reactant, wherein the weight ratio of the trifunctional reactant to the difunctional reactant is between about 1:1,000 and about 1:20.

24. The adhesive of claim 1, wherein the at least one urethane (meth)acrylate oligomer a) comprises a plurality of said oligomers and all of said oligomers have a blocking end group at each of the ends of the oligomers.

25. The adhesive of claim 1, wherein the at least one urethane (meth)acrylate oligomer a) comprises a plurality of said oligomers and the plurality comprises: (i) a first set of said oligomers having one blocking end group at least one of the ends of the oligomer and having one of said at least one polyol backbone segments with an unreacted end at least one of the ends of the oligomer and (ii) a second set of said oligomers having a blocking end group at each of the ends of the oligomer.

26. The adhesive of claim 25, wherein X denotes the number of reacted blocking end groups divided by the number of oligomers in the mixture and wherein X is between 1 and about 3.

27. The adhesive of claim 1, wherein the polyol backbone segment has a functionality of at least two.

28. A method for bonding two substrates with an adhesive comprising the steps of:
applying a curable composition to a first substrate, wherein the curable composition comprises:
a) at least one urethane (meth)acrylate oligomer having a structure comprising:
a1) at least one polyol backbone segment having at least one reacted end;
a2) at least one reacted polyisocyanate forming a urethane linkage at the at least one reacted end of each of said at least one polyol backbone segment; and
a3) at least one blocking end group reacted with said at least one reacted polyisocyanate to form a reversible bond, and wherein said at least one blocking end group bears a (meth)acrylate group;
b) either:
b1) a monofunctional chain terminator or
b2) a polyfunctional chain extender and
c) optionally, at least one monofunctional ethylenically unsaturated monomer or oligomer different from a);
curing the curable composition to form the adhesive having a first set of adhesive properties;
contacting a second substrate with the adhesive to bond the second substrate with the first substrate; and
externally stimulating the cured composition to impart a second set of adhesive properties to the adhesive, different from the first set of adhesive properties.

29. The method of claim 28, wherein the polyol is selected from the group consisting of polyester, polyether, polycaprolactone, polycarbonate, polybutadiene, polydimethylsiloxane and polyfarmasene and combinations thereof.

30. The method of claim 28, wherein the first set of adhesive properties comprises high peel strength and high shear strength and the second set of adhesive properties comprises a reduced value, relative to the first set, of at least one of the peel strength and the shear strength and the method further comprises, after the externally stimulating step, separating the first substrate and the second substrate, wherein b) is the chain terminator b1).

31. The method of claim 30 further comprising, after the externally stimulating step and before the separating step, applying a solvent to the cured composition.

32. The method of claim 28, wherein the first set comprises peel strength and shear strength sufficient to permit adjustment of the first substrate relative to the second substrate and the second set comprises an increased value at least one of the peel strength or the shear strength, relative to the first set, to form a stronger bond between the first and second substrate, and the method further comprises, after the curing step and before the externally stimulating step, adjusting the position of the first substrate relative to the second substrate to provide an adjusted relative position of the first substrate and the second substrate, wherein b) is the chain extender b2).

33. The method of claim 28, wherein the first set of properties comprises peel strength and shear strength sufficient to adhere the adhesive, at low tack, to the first substrate and wherein the second set of properties allows for bonding of the first substrate to the second substrate, wherein b) is the chain extender b2).

34. The method of claim 28, wherein the curing step comprises exposing the curable composition to ultraviolet energy or exposing the curable composition to electron beam energy.

35. The method of claim 28, wherein the externally stimulating step comprises annealing the cured composition.

36. The method of claim 35, wherein the annealing step comprises heating the cured composition at a temperature of between about 75° C. and about 125° C. for a time of between about 1 and 3 hours.

37. The adhesive of claim 1, wherein the adhesive is a pressure sensitive adhesive.

38. The adhesive of claim 1, wherein has a first set of adhesive properties after curing and a second set of adhesive properties, different from the first set, after being subjected to an external stimuli.

39. A curable composition comprising:
 a) at least one urethane (meth)acrylate oligomer having a structure comprising:
  a1) at least one polyol backbone segment having at least one reacted end, wherein the polyol comprises a blend of a high molecular weight polyester and a low molecular weight polyester and the ratio of high molecular weight polyester to low molecular weight polyester ranges from about 1:8 to 3:1;
  a2) at least one reacted polyisocyanate forming a urethane linkage at the at least one reacted end of each of said at least one polyol backbone segment; and
  a3) at least one blocking end group reacted with said at least one reacted polyisocyanate to form a reversible bond and wherein said at least one blocking end group bears a (meth)acrylate group;
 b) either:
  b1) a monofunctional chain terminator or
  b2) a polyfunctional chain extender and
 c) optionally, at least one monofunctional ethylenically unsaturated monomer or oligomer different from a),
 wherein the at least one urethane (meth)acrylate oligomer has a molecular weight distribution having two primary peaks comprising a lower molecular weight peak in a range of 800 to 1,500 g/mol and a higher molecular weight peak in a range of 6,000 to 12,000 g/mol.

40. A curable composition comprising:
 a) at least one urethane (meth)acrylate oligomer having a structure comprising:
  a1) at least one polyol backbone segment having at least one reacted end, wherein the polyol comprises a polyester;
  a2) at least one reacted polyisocyanate forming a urethane linkage at the at least one reacted end of each of said at least one polyol backbone segment; and
  a3) at least one blocking end group reacted with said at least one reacted polyisocyanate to form a reversible bond and wherein said at least one blocking end group bears a (meth)acrylate group;
 b) a polyfunctional chain extender comprising a difunctional reactant and a trifunctional reactant, wherein the weight ratio of the trifunctional reactant to the difunctional reactant is between about 1:1,000 and about 1:20 and
 c) optionally, at least one monofunctional ethylenically unsaturated monomer or oligomer different from a),
 wherein the at least one urethane (meth)acrylate oligomer has a molecular weight distribution having two primary peaks comprising a lower molecular weight peak in a range of 800 to 1,500 g/mol and a higher molecular weight peak in a range of 6,000 to 12,000 g/mol.

* * * * *